United States Patent
Sutton et al.

(10) Patent No.: US 11,845,455 B2
(45) Date of Patent: *Dec. 19, 2023

(54) CONTROL SYSTEMS FOR CORNER MODULES OF AN ELECTRIC VEHICLE, ELECTRIC VEHICLES, AND METHODS OF OPERATION

(71) Applicant: REE AUTOMOTIVE LTD., Kibbutz Glil-Yam (IL)

(72) Inventors: Richard Sutton, York (GB); Ron Toledano, Tel Aviv (IL); Ohad Stauber, Raanana (IL); Eugen Layevski, Baden Baden (DE)

(73) Assignee: REE Automotive Ltd., Kibbutz Glil-Yam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,418

(22) Filed: Oct. 10, 2022

(65) Prior Publication Data
US 2023/0116569 A1    Apr. 13, 2023

Related U.S. Application Data

(63) Continuation of application No. 17/551,217, filed on Dec. 15, 2021, now Pat. No. 11,465,636.
(Continued)

(51) Int. Cl.
*B60W 50/035* (2012.01)
*B60R 16/023* (2006.01)
(Continued)

(52) U.S. Cl.
CPC ....... *B60W 50/035* (2013.01); *B60R 16/0231* (2013.01); *B60W 10/04* (2013.01);
(Continued)

(58) Field of Classification Search
None
See application file for complete search history.

(56) References Cited

U.S. PATENT DOCUMENTS 8,041,993 B2 * 10/2011 Matsubara ............ G06F 11/182
714/48
8,504,178 B2 *  8/2013 Kakino ................... G05B 9/03
700/20
(Continued)

OTHER PUBLICATIONS

PCT search report for PCT/IB2022/050833 which dated May 26, 2022.
(Continued)

*Primary Examiner* — Jonathan M Dager
(74) *Attorney, Agent, or Firm* — Momentum IP; Marc Van Dyke

(57) ABSTRACT

Novel electric vehicles are disclosed herein. In addition, a control system for an electric vehicle comprising a plurality of vehicle corner modules (VCMs) comprises a network of VCM-controllers. Each VCM comprises at least two subsystems selected from a drive subsystem, a steering subsystem, and a braking subsystem. Each VCM-controller is onboard and installed within a different respective VCM, and is operatively linked to each one of the at least two subsystems of its respective VCM to receive sensor data and to regulate operation in response to incoming signals received from outside its VCM. The control system provides a no-fault operating mode defined by the absence of a control-system fault. A VCM-controller of a first VCM is programmed to control, when operating in the no-fault operating mode, at least one subsystem in a second VCM.

19 Claims, 14 Drawing Sheets

Related U.S. Application Data

(60) Provisional application No. 63/144,313, filed on Feb. 1, 2021.

(51) Int. Cl.
| | | |
|---|---|---|
| *B60W 50/04* | (2006.01) | |
| *B60W 50/02* | (2012.01) | |
| *B60W 10/20* | (2006.01) | |
| *B60W 10/18* | (2012.01) | |
| *B60W 10/04* | (2006.01) | |

(52) U.S. Cl.
CPC ............ *B60W 10/18* (2013.01); *B60W 10/20* (2013.01); *B60W 50/0205* (2013.01); *B60W 50/045* (2013.01); *B60W 2710/18* (2013.01); *B60W 2710/20* (2013.01)

(56) References Cited

U.S. PATENT DOCUMENTS

| | | | | |
|---|---|---|---|---|
| 10,459,436 | B2* | 10/2019 | Samii | G05B 23/0286 |
| 11,046,330 | B1* | 6/2021 | Katzourakis | B60W 10/04 |
| 11,180,207 | B2* | 11/2021 | Sardes | B62D 65/04 |
| 11,190,533 | B2* | 11/2021 | Tsurumi | B60R 16/0232 |
| 11,267,522 | B2* | 3/2022 | Sardes | B60K 23/0808 |
| 11,465,636 | B2 | 10/2022 | Sutton | |
| 11,479,313 | B2 | 10/2022 | Sardes | |
| 11,524,667 | B2 | 12/2022 | Orlov | |
| 2005/0113988 | A1* | 5/2005 | Nasr | B60L 15/06 |
| | | | | 701/2 |
| 2005/0154497 | A1* | 7/2005 | Strege | G05B 23/0221 |
| | | | | 700/279 |
| 2006/0015231 | A1* | 1/2006 | Yoshimura | B60L 3/0076 |
| | | | | 701/1 |
| 2006/0212135 | A1* | 9/2006 | Degoul | G05B 9/03 |
| | | | | 700/20 |
| 2008/0296106 | A1* | 12/2008 | Nilsson | B60T 8/345 |
| | | | | 701/115 |
| 2009/0189441 | A1 | 7/2009 | Degoul | |
| 2015/0083508 | A1* | 3/2015 | Bluethmann | B62D 5/0418 |
| | | | | 180/204 |
| 2017/0057505 | A1* | 3/2017 | Woodley | B60W 10/06 |
| 2018/0194353 | A1* | 7/2018 | Kilmurray | B60W 30/18136 |
| 2018/0345777 | A1* | 12/2018 | Birnschein | B62D 21/12 |
| 2018/0370540 | A1* | 12/2018 | Yousuf | G06F 11/1641 |
| 2019/0041837 | A1* | 2/2019 | Elenich | G05B 23/0251 |
| 2019/0250611 | A1* | 8/2019 | Costin | G05D 1/0257 |
| 2019/0291797 | A1* | 9/2019 | Richards | B62D 65/12 |
| 2020/0070788 | A1* | 3/2020 | Michels | B60T 13/66 |
| 2021/0155215 | A1* | 5/2021 | Ganzel | B60T 11/20 |
| 2021/0284262 | A1* | 9/2021 | Sardes | B60K 23/00 |
| 2022/0055586 | A1* | 2/2022 | Orlov | B60T 1/10 |
| 2023/0032858 | A1 | 2/2023 | Sardes | |

OTHER PUBLICATIONS

PCT search opinion for PCT/IB2022/050833 which dated May 26, 2022.

* cited by examiner

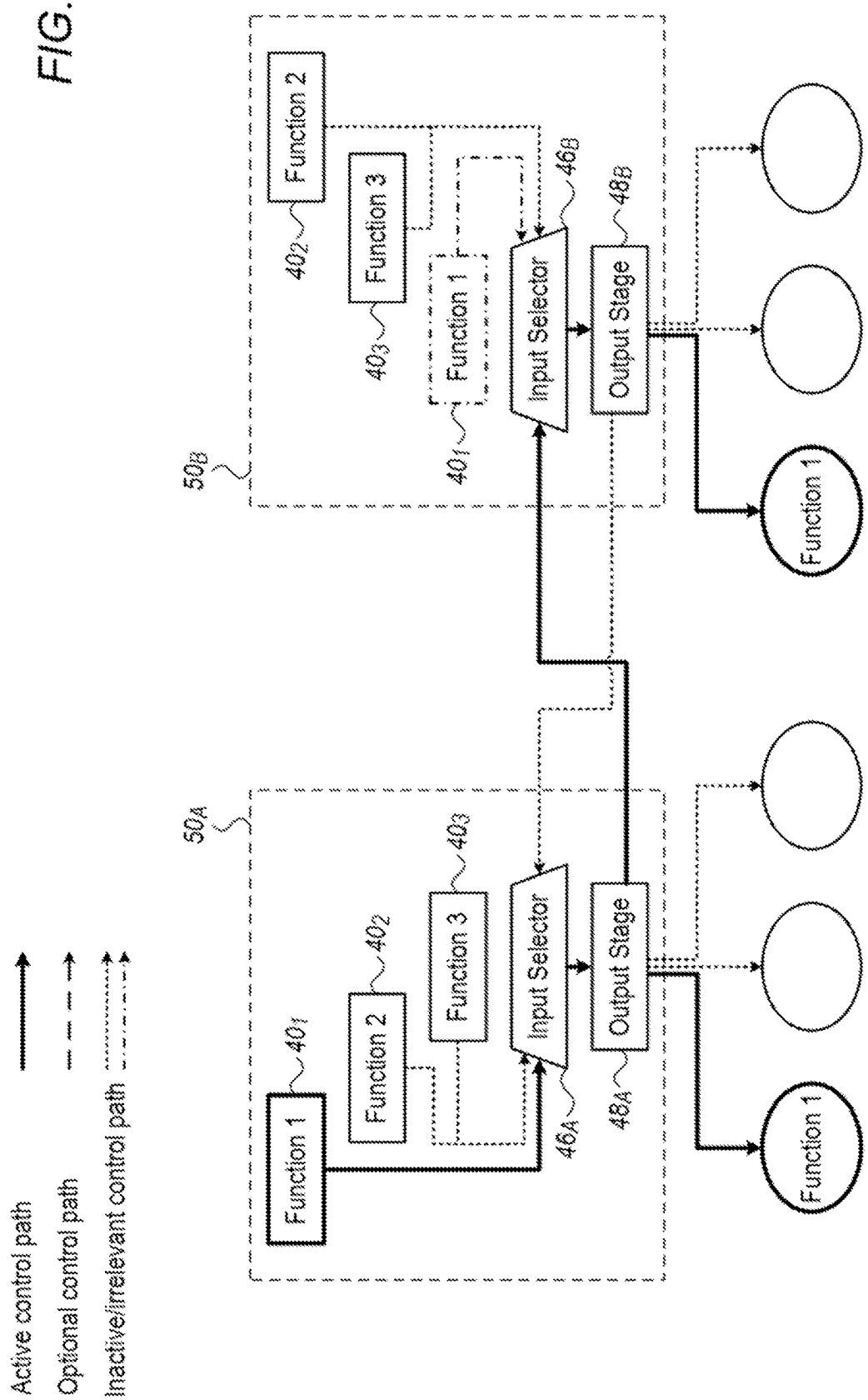

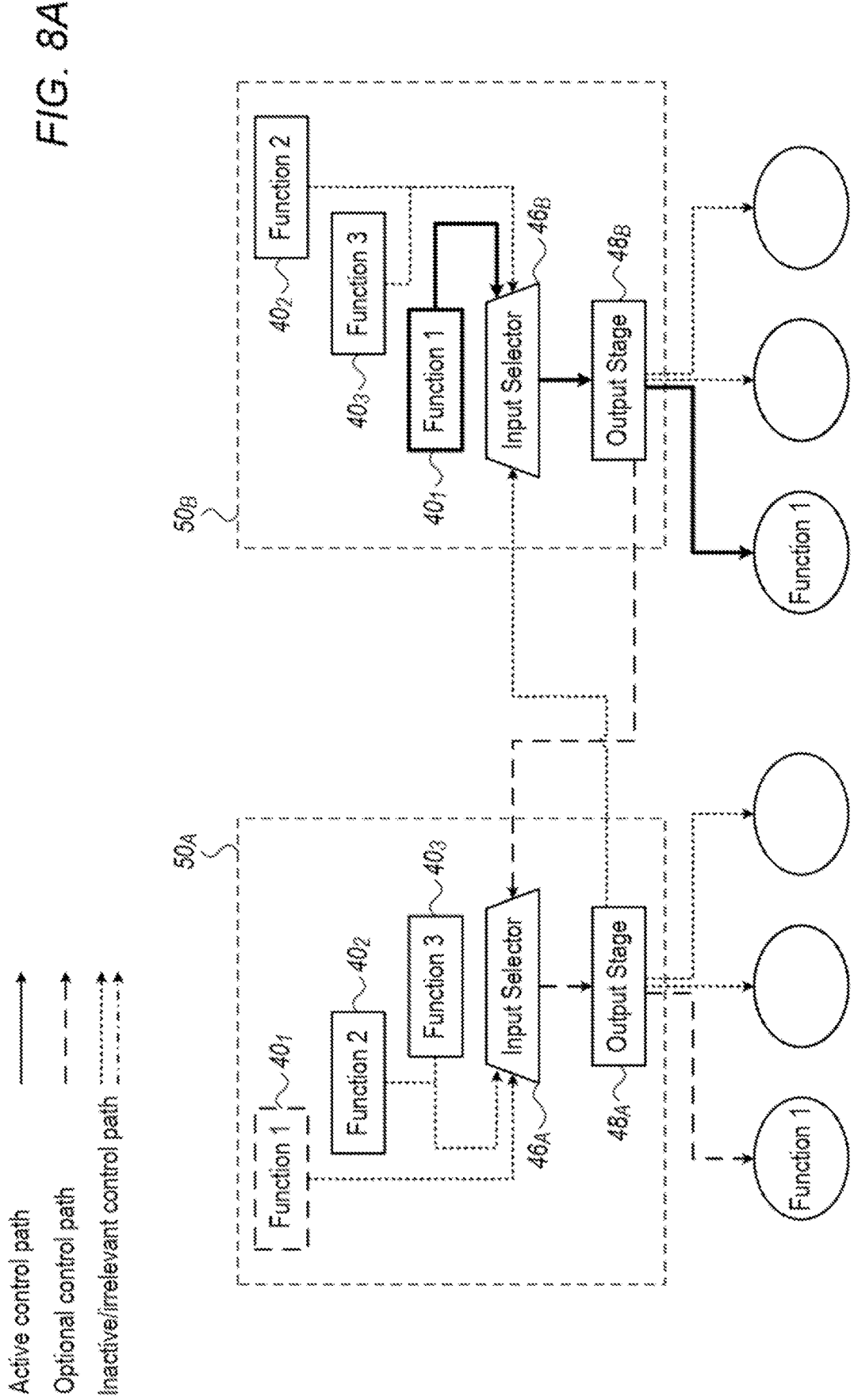

CONTROL SYSTEMS FOR CORNER MODULES OF AN ELECTRIC VEHICLE, ELECTRIC VEHICLES, AND METHODS OF OPERATION

CROSS-REFERENCE TO RELATED APPLICATIONS

U.S. application Ser. No. 63/144,313, which was filed on Feb. 1, 2021, is incorporated herein by reference in its entirety. U.S. application Ser. No. 17/551,217, which was filed on Dec. 15, 2021, is incorporated herein by reference in its entirety.

FIELD OF THE INVENTION

The present invention relates to vehicle corner modules (VCMs) for regulating motion of host vehicles, and particularly to VCMs comprising onboard mechanical and electrical sub-systems of the VCMs.

BACKGROUND

Onboard vehicle systems have been developed and improved over the course of more than a century, resulting in sophisticated designs that integrate and centralize the management of the various mechanical and electrical sub-systems. Available control systems are limited to managing individual functionalities and do not integrate or combine the management of multiple sub-systems.

Newly-conceived vehicle platforms designed for electric propulsion can include modular axle-less wheel assemblies (vehicle corner modules, or VCMs) requiring independent functional sub-systems such as drivetrain, braking, and steering sub-systems installed at individual wheels. These designs require new control models for safely managing the operation of the vehicles in both no-fault and fault conditions.

SUMMARY

Novel electric vehicles are disclosed herein. In addition, a control system for an electric vehicle is disclosed according to embodiments of the invention, wherein the vehicle comprises a plurality of vehicle corner modules (VCMs), and each VCM comprises at least two subsystems selected from the group of subsystems consisting of a drive subsystem, a steering subsystem, and a braking subsystem. The control system comprises: a network of VCM-controllers, each VCM-controller being (i) onboard and installed within a different respective VCM of the plurality of VCMs, and (ii) operatively linked to each one of the at least two subsystems of its respective VCM to receive therefrom sensor data and to regulate operation thereof in response to incoming signals received from outside its respective VCM, wherein in a no-fault operating mode defined by the absence of a control-system fault, each VCM controller regulates, in response to the incoming signals, actuation of a first sub-system of the at least two sub-systems in its own respective VCM and in at least one other VCM.

In some embodiments, the no-fault operating mode can be characterized in that actuation in its own respective VCM of a second sub-system of the at least two sub-systems is regulated by a VCM-controller of a different VCM that is not its own respective VCM.

A control system for a vehicle is disclosed according to embodiments of the invention, wherein the vehicle comprises a plurality of vehicle corner modules (VCMs), and each VCM comprises at least two subsystems selected from the group of subsystems consisting of a drive subsystem, a steering subsystem, and a braking subsystem. The control system comprises: a network of VCM-controllers, each VCM-controller being (i) onboard and installed within a different respective VCM of the plurality of VCMs, and (ii) operatively linked to each one of the at least two subsystems of its respective VCM to receive therefrom sensor data and to regulate operation thereof in response to incoming signals received from outside its respective VCM, wherein in a no-fault operating mode defined by the absence of a control-system fault, at least one sub-system of the at least two sub-systems in each respective VCM is regulated by a VCM-controller of a different VCM that is not the respective VCM, in response to the incoming signals.

A control system for a vehicle is disclosed according to embodiments of the invention, wherein the vehicle comprises a plurality of vehicle corner modules (VCMs), and each VCM comprises at least two subsystems selected from the group of subsystems consisting of a drive subsystem, a steering subsystem, and a braking subsystem. The control system comprises: a network of VCM-controllers, each VCM-controller being (i) onboard and installed within a different respective VCM of the plurality of VCMs, and (ii) operatively linked to each one of the at least two subsystems of its respective VCM to receive therefrom sensor data and to regulate operation thereof in response to incoming signals received from outside its respective VCM, wherein in a no-fault operating mode defined by the absence of a control-system fault, each VCM controller regulates, in response to the incoming signals, actuation of a first sub-system of the at least two sub-systems in its own respective VCM and in at least one other VCM, the no-fault operating mode being characterized in that actuation in its own respective VCM of a second sub-system of the at least two sub-systems is regulated by a VCM-controller of a different VCM that is not its own respective VCM.

For any one of the control systems disclosed herein, in a first fault-responsive operating mode, each VCM-controller installed in a VCM comprising said second sub-system can regulate actuation of said second sub-system in its own respective VCM, and/or the first fault-responsive operating mode can be characterized by the VCM-controller of the different VCM that is not its own respective VCM being disabled from regulating actuation of said second sub-system in the own respective VCM.

For any one of the control systems disclosed herein, in a second fault-responsive operating mode, a VCM-controller of a given VCM can regulate actuation of a given sub-system of the at least two sub-subsystems in a different VCM that is not the given VCM, and/or the second fault-responsive operating mode can be characterized by the VCM controller of the different VCM being disabled from regulating actuation, in the different VCM, of said given sub-system.

For any one of the control systems disclosed herein, in a third fault-responsive operating mode, a VCM controller of a given VCM can regulate actuation of the respective at least two subsystems in a different VCM that is not the given VCM, and/or the third fault-responsive operating mode can be characterized by the VCM controller of the different VCM being disabled from regulating actuation of one or more of the at least two sub-systems in the different VCM.

For any one of the control systems disclosed herein, in a fourth fault-responsive operating mode, a VCM controller of a given VCM can regulate actuation of the at least two subsystems in the given VCM, and/or the fourth fault-responsive mode can be characterized by a plurality of VCM-controllers of different respective VCMs, none of which are the given VCM, being disabled from regulating actuation of respective sub-systems of the at least two sub-systems in the respective VCM.

For any one of the control systems disclosed herein, said first sub-system can be selected in accordance with an operating profile assigned to the respective VCM.

For any one of the control systems disclosed herein, the incoming signals can be selected from the group of signals comprising electrical, electronic, and optically-transmitted signals.

Any one of the control systems disclosed herein can incorporate any or all of the features of the four disclosed fault-responsive operating modes in any combination.

A vehicle is disclosed according to embodiments of the invention, wherein the vehicle can comprise any one of the control systems disclosed herein.

A controller for installation onboard a vehicle corner module (VCM) is disclosed according to embodiments of the invention, wherein the VCM comprises at least two subsystems selected from the group of subsystems consisting of a drive subsystem, a steering subsystem, and a braking subsystem. The controller comprises: (a) communications arrangements for establishing electronic communication (i) with respective controllers of other VCMs so as to join a control-system network of networked VCM-controllers, and (ii) with each one of the at least two subsystems in the VCM and in at least one other VCM; (b) one or more processors; and (c) a computer-readable medium storing program instructions that, when executed by the one or more processors, cause the one or more processors to regulate, in the absence of a control-system fault-condition and responsively to incoming signals received from outside the VCM, actuation of a first sub-system of the at least two sub-systems in the VCM and in at least one other VCM.

In some embodiments, it can be that there exists a second sub-system of the at least two sub-systems in the VCM, the actuation of which is not regulated by the one or more processors when the stored program instructions are executed by the one or more processors, in the absence of a control-system fault indicating that a different networked VCM-controller is disabled from regulating actuation of said second sub-In system in the VCM. In some embodiments, it can be that there exists a second sub-system of the at least two sub-systems in the VCM, the actuation of which is not regulated by the one or more processors when the stored program instructions are executed by the one or more processors, subject to the controller receiving a control-system indication that a different networked VCM-controller is enabled to regulate actuation of said second sub-system in the VCM.

In some embodiments, the computer-readable medium can additionally store program instructions that, when executed by the one or more processors, cause the one or more processors to regulate actuation of said second sub-system in the VCM, responsively to a control-system fault indicating that the different VCM-controller is disabled from regulating actuation of said second sub-system in the VCM.

In some embodiments, the computer-readable medium can additionally store program instructions that, when executed by the one or more processors, cause the one or more processors to regulate actuation of a given sub-system of the at least two sub-subsystems in a different VCM comprising a respective networked VCM-controller, responsively to a control-system fault indicating that the respective VCM controller of the different VCM is disabled from regulating actuation of said given sub-system in the different VCM.

In some embodiments, the computer-readable medium can additionally store program instructions that, when executed by the one or more processors, cause the one or more processors to regulate actuation of the respective at least two subsystems in a different VCM comprising a respective networked VCM-controller, responsively to a control-system fault indicating that the respective VCM controller of the different VCM is disabled from regulating actuation of one or more of the at least two sub-systems in the different VCM.

In some embodiments, the computer-readable medium can additionally store program instructions that, when executed by the one or more processors, cause the one or more processors to regulation actuation of the at least two subsystems in the VCM, responsively to a control-system fault indicating that no other VCM-controllers of the network of VCM-controllers are enabled to regulate actuation of any sub-systems of the at least two subsystems in the VCM.

In some embodiments, the incoming signals can be selected from the group of signals comprising electrical, electronic, and optically-transmitted signals.

In embodiments, a controller can include any or all of the disclosed program instructions in any combination.

According to embodiments of the invention, a control system can comprise any one of the controllers disclosed herein. In some embodiments, a vehicle can comprise such a control system.

According to embodiments of the invention, a VCM can comprise any one of the controllers disclosed herein. In some embodiments, a vehicle can comprise at least one pair of such VCMs.

According to embodiments of the invention, a vehicle can comprise any one of the controllers disclosed herein.

A method is disclosed, according to embodiments, of operating a vehicle. According to the method, the vehicle comprises (i) at least one pair of vehicle corner modules (VCMs), each VCM comprising at least two subsystems selected from the group of subsystems consisting of a drive subsystem, a steering subsystem, and a braking subsystem, and (ii) a network of networked VCM-controllers, each VCM-controller being (A) onboard and installed within a different respective VCM, and (B) in electronic communication with each one of the at least two subsystems of its respective VCM and with other VCM-controllers of the network of VCM-controllers. The method comprises the following steps carried out by a first VCM-controller of the network of VCM-controllers: receiving incoming signals from outside its respective VCM; monitoring the incoming signals for control-system faults; and in response to the incoming signals and in the absence of a control-system fault, regulating actuation of a first sub-system of the at least two sub-systems in its own respective VCM and in at least one other VCM comprising a respective networked VCM-controller.

In some embodiments, the method can further comprise the following steps carried out by a second VCM-controller of the network of VCM-controllers: receiving second incoming signals from outside its respective VCM; monitoring the second incoming signals for control-system faults; and/or in response to the second incoming signals and in the absence of a control-system fault, regulating actuation of a second sub-system of the at least two sub-systems in the respective VCM of the first VCM-controller.

In some embodiments, the method can further comprise the following steps carried out by the first VCM-controller: detecting, in the incoming signals, an indication of a control-system fault according to which the second VCM-controller is disabled from regulating actuation of said second sub-system in the VCM; and/or, in response to the indication of the control-system fault, regulating actuation of said second sub-system in the VCM.

In some embodiments, the method can further comprise the following steps carried out by the first VCM-controller: detecting, in the incoming signals, an indication of a control-system fault according to which a different networked VCM-controller is disabled from regulating actuation of a given sub-system of the at least two sub-subsystems in its respective VCM; and/or, in response to the indication of the control-system fault, regulating actuation of said given sub-system in the respective VCM.

In some embodiments, the method can further comprise the following steps carried out by the first VCM-controller: detecting, in the incoming signals, an indication of a control-system fault according to which a different networked VCM-controller is disabled from regulating actuation of one or more sub-systems of the at least two sub-subsystems in its respective VCM; and/or, in response to the indication of the control-system fault, regulating actuation of the at least two sub-subsystems in the respective VCM.

In some embodiments, the method can further comprise the followings steps carried out by the first VCM-controller: detecting, in the incoming signals, an indication of a control-system fault according to which no other VCM-controllers of the network of VCM-controllers are enabled to regulate actuation of any sub-systems of the at least two subsystems in the VCM; and/or, in response to the indication of the control-system fault, regulating actuation of the at least two subsystems in the VCM.

In some embodiments of the method, the incoming signals can be selected from the group of signals comprising electrical, electronic, and optically-transmitted signals.

A control system for a vehicle is disclosed, according to embodiments of the invention, wherein the vehicle comprises a plurality of vehicle corner modules (VCMs), and each VCM comprises at least two subsystems selected from a drive subsystem, a steering subsystem, and a braking subsystem. The control system comprises: a network of VCM-controllers, each VCM-controller being (i) onboard and installed within a different respective VCM of the plurality of VCMs, and (ii) operatively linked to each one of the at least two subsystems of its respective VCM to receive therefrom sensor data and to regulate operation thereof in response to incoming signals received from outside its respective VCM. The control system provides a no-fault operating mode defined by the absence of a control-system fault, and a VCM-controller of a first VCM is programmed to control, when operating in the no-fault operating mode, at least one subsystem in a second VCM.

In some embodiments, it can be that in the no-fault operating mode each VCM controller regulates, in response to the incoming signals, actuation of a first sub-system of the at least two sub-systems in its own respective VCM and a first sub-system of the respective at least two sub-systems in at least one other VCM.

In some embodiments, it can be that the no-fault operating mode is characterized in that actuation in its own respective VCM of a second sub-system of the at least two sub-systems is regulated by a VCM-controller of a different VCM that is not its own respective VCM.

In some embodiments, it can be that in the no-fault operating mode, at least one sub-system of the at least two sub-systems in each respective VCM is regulated by a VCM-controller of a different VCM that is not the respective VCM, in response to the incoming signals.

In some embodiments, it can be that (i) in the no-fault operating mode, each VCM controller regulates, in response to the incoming signals, actuation of a first sub-system of the at least two sub-systems in its own respective VCM and in at least one other VCM, and/or (ii) the no-fault operating mode is characterized in that actuation in its own respective VCM of a second sub-system of the at least two sub-systems is regulated by a VCM-controller of a different VCM that is not its own respective VCM.

In some embodiments, it can be that in a first fault-responsive operating mode, a VCM-controller installed in the second VCM regulates actuation of a given sub-system in the second VCM, the first fault-responsive operating mode being characterized by the VCM-controller of the first VCM being disabled from regulating actuation of said second sub-system in the second VCM.

In some embodiments, it can be that in a second fault-responsive operating mode, a VCM-controller of a given VCM regulates actuation of a given sub-system of the at least two sub-subsystems in a different VCM that is not the given VCM, the second fault-responsive operating mode being characterized by the VCM controller of the different VCM being disabled from regulating actuation, in the different VCM, of said given sub-system.

In some embodiments, it can be that in a third fault-responsive operating mode, a VCM controller of a given VCM regulates actuation of the respective at least two subsystems in a different VCM that is not the given VCM, the third fault-responsive operating mode being characterized by the VCM controller of the different VCM being disabled from regulating actuation of one or more of the at least two sub-systems in the different VCM.

In some embodiments, it can be that in a fourth fault-responsive operating mode, a VCM controller of a given VCM regulates actuation of the at least two subsystems in the given VCM, the fourth fault-responsive mode being characterized by a plurality of VCM-controllers of different respective VCMs, none of which are the given VCM, being disabled from regulating actuation of respective sub-systems of the at least two sub-systems in the respective VCM.

In some embodiments, said first sub-system can be selected in accordance with an operating profile assigned to the respective VCM.

A controller for installation onboard a vehicle corner module (VCM) is disclosed, according to embodiments of the invention, wherein the VCM comprises at least two subsystems selected from a drive subsystem, a steering subsystem, and a braking subsystem. The controller comprises: (a) communications arrangements for establishing electronic communication (i) with respective controllers of other VCMs so as to join a control-system network of networked VCM-controllers, and (ii) with each one of the at least two subsystems in the VCM and in at least one other VCM; (b) one or more processors; and (c) a computer-readable medium storing program instructions that, when executed by the one or more processors, cause the one or more processors to regulate, in the absence of a control-system fault-condition and responsively to incoming signals received from outside the VCM, actuation of a first sub-system of the at least two sub-systems in the VCM and a first sub-system of the respective at least two sub-systems in at least one other VCM.

In some embodiments, it can be that there exists a second sub-system of the at least two sub-systems in the VCM, the actuation of which is not regulated by the one or more processors, when the stored program instructions are executed by the one or more processors, in the absence of a control-system fault indicating that a different networked VCM-controller is disabled from regulating actuation of said second sub-system in the VCM.

In some embodiments, it can be that there exists a second sub-system of the at least two sub-systems in the VCM, the actuation of which is not regulated by the one or more processors when the stored program instructions are executed by the one or more processors, subject to the VCM-controller receiving a control-system indication that a different networked VCM-controller is enabled to regulate actuation of said second sub-system in the VCM.

In some embodiments, it can be that the computer-readable medium additionally stores program instructions that, when executed by the one or more processors, cause the one or more processors to regulate actuation of said second sub-system in the VCM responsively to a control-system fault indicating that the different VCM-controller is disabled from regulating actuation of said second sub-system in the VCM.

In some embodiments, it can be that the computer-readable medium additionally stores program instructions that, when executed by the one or more processors, cause the one or more processors to regulate actuation of a given sub-system of the at least two sub-subsystems in a different VCM comprising a respective networked VCM-controller, responsively to a control-system fault indicating that the respective VCM controller of the different VCM is disabled from regulating actuation of said given sub-system in the different VCM.

In some embodiments, it can be that the computer-readable medium additionally stores program instructions that, when executed by the one or more processors, cause the one or more processors to regulate actuation of the respective at least two subsystems in a different VCM comprising a respective networked VCM-controller, responsively to a control-system fault indicating that the respective VCM controller of the different VCM is disabled from regulating actuation of one or more of the at least two sub-systems in the different VCM.

In some embodiments, it can be that the computer-readable medium additionally stores program instructions that, when executed by the one or more processors, cause the one or more processors to regulation actuation of the at least two subsystems in the VCM, responsively to a control-system fault indicating that no other VCM-controllers of the network of VCM-controllers are enabled to regulate actuation of any sub-systems of the at least two subsystems in the VCM.

In some embodiments, a control system for a vehicle can comprise any controller disclosed hereinabove.

A method is disclosed, according to embodiments, of operating a vehicle. According to the method, the vehicle comprises (i) at least one pair of vehicle corner modules (VCMs), each VCM comprising at least two subsystems selected from the group of subsystems consisting of a drive subsystem, a steering subsystem, and a braking subsystem, and (ii) a network of networked VCM-controllers, each VCM-controller being (A) onboard and installed within a different respective VCM, and (B) in electronic communication with each one of the at least two subsystems of its respective VCM and with other VCM-controllers of the network of VCM-controllers. The method comprises the following steps carried out by a first VCM-controller of the network of VCM-controllers: receiving incoming signals from outside its respective VCM; monitoring the incoming signals for control-system faults; and in response to the incoming signals and in the absence of a control-system fault, regulating actuation of at least one subsystem in a second VCM that is not its own respective VCM.

In some embodiments, the regulating can include regulating actuation of a first sub-system of the at least two sub-systems in its own respective VCM and a first sub-system of the respective at least two sub-systems in at least one other VCM comprising a respective networked VCM-controller.

In some embodiments, the method can further comprise the following step(s) carried out by a second VCM-controller of the network of VCM-controllers: receiving second incoming signals from outside its respective VCM; monitoring the second incoming signals for control-system faults; and/or in response to the second incoming signals and in the absence of a control-system fault, regulating actuation of a second sub-system of the at least two sub-systems in the respective VCM of the first VCM-controller.

In some embodiments, the method can further comprise the following step(s) carried out by the first VCM-controller: detecting, in the incoming signals, an indication of a control-system fault according to which the second VCM-controller is disabled from regulating actuation of said second sub-system in the VCM; and/or in response to the indication of the control-system fault, regulating actuation of said second sub-system in the VCM.

In some embodiments, the method can further comprise the following step(s) carried out by the first VCM-controller: detecting, in the incoming signals, an indication of a control-system fault according to which a different networked VCM-controller is disabled from regulating actuation of a given sub-system of the at least two sub-subsystems in its respective VCM; and/or in response to the indication of the control-system fault, regulating actuation of said given sub-system in the respective VCM.

In some embodiments, the method can further comprise the following step(s) carried out by the first VCM-controller: detecting, in the incoming signals, an indication of a control-system fault according to which a different networked VCM-controller is disabled from regulating actuation of one or more sub-systems of the at least two sub-subsystems in its respective VCM; and/or in response to the indication of the control-system fault, regulating actuation of the at least two sub-subsystems in the respective VCM.

In some embodiments, the method can further comprise the followings step(s) carried out by the first VCM-controller: detecting, in the incoming signals, an indication of a control-system fault according to which no other VCM-controllers of the network of VCM-controllers are enabled to regulate actuation of any sub-systems of the at least two subsystems in the VCM; and/or in response to the indication of the control-system fault, regulating actuation of the at least two subsystems in the VCM.

In embodiments, a method can comprise any or all of the method steps disclosed herein, in any combination.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIGS. 7A and 7B are block diagrams of a pair of VCM-controllers operating in the absence of a control-system fault, according to embodiments of the present invention;

FIGS. 8A, 8B, and 8C are block diagrams of a pair of VCM-controllers operating in the presence of a control-system fault, according to embodiments of the present invention;

Figure 1:
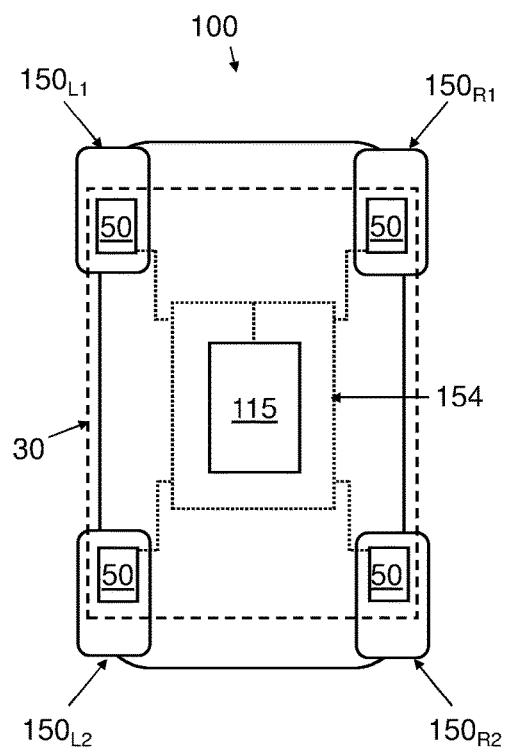
FIG. 1 is a schematic drawing of a vehicle comprising a communications bus, a plurality of VCMs, and a control system, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous elements.

DETAILED DESCRIPTION OF THE PRESENT INVENTION

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

Note: Throughout this disclosure, subscripted reference numbers (e.g., $10_1$ or $10_A$) may be used to designate multiple separate appearances of elements of a single species, whether in a drawing or not; for example: $10_1$ is a single appearance (out of a plurality of appearances) of element 10. The same elements can alternatively be referred to without subscript (e.g., 10 and not $10_1$) when not referring to a specific one of the multiple separate appearances, i.e., to the species in general.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

According to embodiments of the invention, apparatus, systems, and methods are disclosed for operation of a vehicle in no-fault conditions, i.e., conditions in which no control-system fault has been identified and/or communicated, and in fault-responsive conditions, i.e., conditions in which a control-system fault has been identified and/or communicated. The apparatus and methods include a control system, a network of controllers and individual controllers. The methods are suitable for being carried out by the disclosed apparatus and systems.

More specifically, the embodiments relate to operation of a vehicle comprising a plurality of vehicle corner modules. Unless otherwise indicated, a "vehicle corner module" or "VCM" as used herein means an assembly for supporting a wheel of a vehicle and regulating the motion of a vehicle according to any of the embodiments disclosed herein. The VCM assembly includes components such as (and not exhaustively): steering systems, suspension systems, braking systems including hydraulic sub-systems, gearing assemblies, drive motors, driveshafts, wheel hub assemblies, controllers, communications arrangements, and electrical wiring. In some embodiments, a VCM can include a wheel and tire. A VCM can be mounted to a 'reference frame' of a vehicle, e.g., a chassis or similar vehicle frame or a platform, although the mounting need not necessarily be done 'as a unit'. When a VCM is described as being installed in/on a vehicle, then the VCM is mounted to the reference frame. A VCM may include a 'sub-frame' to which some or all of the VCM components are mounted or otherwise attached such that the sub-frame mediates between the reference frame and the various VCM components. The term 'sub-frame' should be understood to mean any rigid frame or one or more structural elements in fixed combination. The 'sub' prefix is intended to distinguish the sub-frame from a main frame or reference frame of the vehicle. A VCM may or may not include one or more electric motors and/or the wheel itself (and tire).

When used in this specification and in the claims appended hereto, the word "vehicle" is to be understood as referring to a motorized vehicle having one or more wheels. Non-limiting examples of a vehicle, according to this definition, are a vehicle with motive power provided by an onboard engine, and an 'electric vehicle' powered, when in motion, by one or more electric motors and a battery or other energy storage device onboard. The battery need not be provided with the vehicle, or installed in the vehicle, unless and until the vehicle is in motion. The word 'vehicle' should also be understood as encompassing a "vehicle platform" comprising at least a chassis (or other 'reference frame' to which VCMs can be mounted) and one or more wheels. A 'vehicle platform' need not necessarily comprise, at the time of providing the vehicle platform, all of the accoutrements required for transport of passengers and/or cargo such as vehicle-body components or interior furnishings.

As disclosed hereinbelow, operation of a vehicle, including regulating the actuation of one or more sub-systems performing operational functions, can be controlled and/or managed by one or more VCM-controllers. A VCM-controller is a controller installed onboard a VCM and programmed to regulate the actuation of at least one of the functional sub-systems at least in its own VCM. Some VCM-controllers are programmed, i.e., have access to program instructions executable by one or more processors of the VCM-controller, to regulate the actuation of a plurality of functional sub-systems in the VCM or of all the functional sub-systems in the VCM. As will be further described, in some embodiments of the invention, a VCM-controller can be additionally programmed to regulate the actuation of at least one of the functional sub-systems of one or more other VCMs. In embodiments, a VCM-controller can be additionally programmed to regulate the actuation of a plurality of functional sub-systems in the one or more other VCM or of all the functional sub-systems in the one or more other VCMs.

The expression 'regulate actuation' as used herein means to perform a control function that includes, but not exhaustively: activation, cessation, modulation, and management of a physical and/or electrical and/or electronic function. Regulating actuation can also include monitoring the operation and/or performance of a functional sub-system and actively performing or changing a control function in response to information received in the monitoring. Regulating actuation can also include any or all of: conducting test procedures on the regulated or controlled sub-systems, collecting operational and maintenance data on the regulated or controlled sub-systems, and maintaining and communicating status information of the regulated or controlled sub-systems.

The term "controller" as used herein means a computing device configured for monitoring, controlling, regulating and/or actuating one or more components, systems or sub-systems. A controller should be understood to include any or all of (and not exhaustively): one or more processors, one or more computer-readable media, e.g., transient and/or non-transient storage media, e.g., media containing program instructions for execution by the one or processors, communications arrangements, one or more power sources and/or a connection to a power source, and firmware and/or software. When used herein in a hyphenated expression such as vehicle-controller or VCM-controller, the term means a controller for controlling the vehicle and/or components and/or sub-systems of the vehicle, or a controller for controlling the VCM and/or components and/or sub-systems of the VCM, respectively. Unless specifically noted otherwise, a controller is installed in or on the controlled element (vehicle, VCM, etc.). For example, a VCM-controller is located in or on the VCM which is the primary VCM for control by that VCM-controller. Controllers (and control units) can be programmed in advance, e.g., by having program instructions stored in the computer-readable media for execution by one of more processors of the controller. Thus, a controller 'configured' to perform a function is equivalent herein to the controller being programmed, i.e., having access to stored program instructions for execution, to perform said function. A VCM-controller, according to embodiments, can regulate actuation of a function, e.g., a function performed by a mechanical and/or electrical sub-system of a VCM; such regulation can be of the function in a VCM-controller's 'own respective VCM' or in any other VCM (or VCMs) with which the VCM-controller is in electronic communication; such electronic communication can be with a VCM-controller of the other VCM or VCMs and/or with any systems or sub-systems of the other VCM or VCMs. Regulating actuation of a function (or, equivalently, of a sub-system configured to perform such a function) can include the entire range of operations related to the function. In a non-limiting example, a drive function performed by a drive sub-system can include starting, accelerating, speed-keeping, slowing (e.g., using the engine mass or in concert with another sub-system such as, for example, a braking sub-system), and stopping. A VCM-controller can include multiple control modules, for example control modules that are programmed to control specific functions such as braking, steering, etc.

In embodiments, a vehicle may be fully controlled through all aspects of the vehicle operation where all computing work is carried out by one or more of the computing units of the VCMs, i.e., the VCM-controllers. A VCM may be in active communication not only with the vehicle platform but also, or alternatively, with at least one other VCM. VCMs of a vehicle may be all of the same type, or may differ having same type at the front and having another type at the rear of the vehicle. In some other examples VCMs of one side may be of the same type and VCMs of the other side may be of a different type. For example, in a specific type of vehicle the front VCMs may be steerable and motorized while the rear VCMs may lack steering and/or motorizing capabilities. In another example, the VCMs may differ from each other by the sensors they are equipped with. In such embodiments VCMs that have more sensors may communicate relevant data to other VCMs lacking these sensors. In another example, the VCMs may differ from each other by having different performance profiles (e.g. size, response, power).

The terms "communications arrangements" or similar terms such as "communications schemes" as used herein mean any wired connection or wireless connection via which data communications can take place. Non-limiting and non-exhaustive examples of suitable technologies for providing communications arrangements include any short-range point-to-point communication system such as IrDA, RFID (Radio Frequency Identification), TransferJet, Wireless USB, DSRC (Dedicated Short Range Communications), or Near Field Communication; wireless networks (including sensor networks) such as: ZigBee, EnOcean; Wi-fi, Bluetooth, TransferJet, or Ultra-wideband; and wired communications bus technologies such as. CAN bus (Controller Area Network, Fieldbus, FireWire, HyperTransport and InfiniBand. "Establishing a communications link" as used herein means initiating and/or maintaining data communications between two or more processing units (e.g., controllers, computers, processors, etc.) in accordance with any of the communications protocols supported by the two or more communicating nodes.

As used throughout this disclosure and the claims appended hereto, the term "electrical signals" or similar terms such as "electrical inputs" means electrical and/or electronic, and includes any transmission of either direct or alternating electric current, of electronic information, or of any combination of electrical and electronic signals and information. As used throughout this disclosure and the claims appended hereto, the term "signals" without a modifier (such as, e.g., "electrical") means electrical, electronic and/or optically-transmitted signals but does not include mechanically transmitted 'signals', e.g., instructions. Examples of electrical signals included in the definition of 'signals' include any one or any combination of voltage, current, power, resistance and capacitance transferred or propagated so as to reach a VCM (including, in some examples, VCM-controller. By their nature, electrical signals (excluding electronic signals) are transferred over physical connections. Examples of electronic signals include any type or format of data communication transmitted over wire or wirelessly, and can include, and not exhaustively: specific or implicit instructions for actuation, regulation or cessation of operation of a VCM system or sub-system; sensor data and/or status, alarm/fault indications including fault-condition statuses and instructions; periodic, scheduled, and/or special status requests and messages; test messages; and diagnostic requests and results. Examples of optically-transmitted signals include, without limitation, the foregoing examples of electronic signals, although transmitted at least in part over optical communications infrastructure.

A "control system" as the term is used herein means a networked system that includes coordinated and/or networked plurality of controllers. In one example, a control system can include a network of VCM-controllers that comprises all of the VCM-controllers of a vehicle. In another example, the control system can additionally include a vehicle-controller. In other examples, the control system can additionally include other controllers such as, for example, a power management system, a battery management system, or a thermal management system. An autonomy computer can be present and in data communication with the control system.

According to embodiments, a control system can be configured such that in normal operation, i.e., in the absence of control-system faults, a first VCM-controller regulates the actuation of a first functional sub-system in its own respective VCM and in at least one other VCM. At the same time, a second VCM-controller regulates the actuation of a second functional sub-system in the VCM of the second VCM-controller as well as in the own respective VCM of the first VCM-controller. Such an arrangement has been found by the inventors to improve the overall performance of a control system by enabling a VCM-controller to control a given vehicle function (e.g., steering or braking) across multiple VCMs. When a control-system fault occurs, appropriate and timely responses are required in order to maintain the continued safe operation of the vehicle. Control-system faults can include controller faults and communications faults. Responses can be based on whether the sub-system affected is a fail-safe system or a fail-operational system. Reponses can be selected to ensure that a redundant component, e.g., a control module, is enabled within a fault-tolerant time interval.

Referring now to the figures, and in particular to FIG. 1, a vehicle 100 includes a communications bus 154 that connects respective VCM-controllers 50 to each other. In some embodiments, the communications bus 154 can additionally enable communication between the vehicle-controller 115 and any one or more (or all) of the VCM-controllers 50. An example of a communications bus 153 or 154 is a multi-master serial bus configured as a controller area network (CAN) bus. In some embodiments (not shown), physically separated and/or assigned, e.g. permanently or temporarily assigned, communications channels can be implemented between specific endpoints alongside the bus or as extensions of the bus. For example, a VCM-controller can be in such 'direct-channel' communications with sensors deployed within a respective VCM. As shown in the example of FIG. 1, a vehicle 100 can include multiple pairs of opposing VCMs 150, i.e., opposing wheels. In other examples (not shown) a vehicle can include just a single pair of VCMs while other wheels of the vehicle, if any, are implemented in other manners, e.g., using conventional arrangements for steering, drive, braking, and/or suspension systems. FIG. 1 also shows a control system 30 which includes four VCM-controllers $50_{L1}$, $50_{R1}$, $50_{L2}$, $50_{R2}$, and the vehicle controller 115, all interconnected by the communications bus 154.

Figure 2:
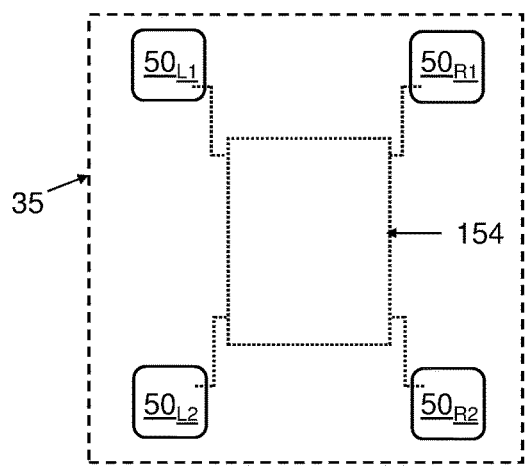
FIG. 2 shows a detail of a portion of the communications bus of FIG. 1, according to embodiments of the present invention.

FIG. 2 illustrates a network 35 of VCM-controllers 50, including VCM-controllers $50_{L1}$, $50_{R1}$, $50_{L2}$, and $50_{R2}$. They are shown in FIG. 2 as being interconnected by the communications bus 154, but other communications arrangements can also be suitable, such as, for example, direct communications links (not shown) between each pair of VCM-controllers, i.e., between VCM-controller pairs $50_{L1}$-$50_{R1}$, $50_{L1}$-$50_{R2}$, $50_{L1}$-$50_{R2}$, $50_{L2}$-$50_{R2}$, $50_{L2}$-$50_{R2}$, and $50_{R1}$-$50_{R2}$.

Figure 3:
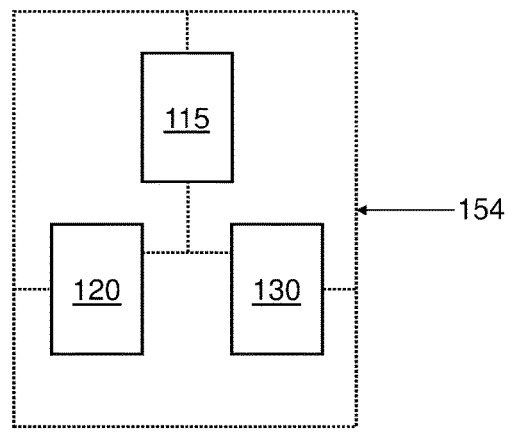
FIG. 3 shows a network of VCM-controllers of the vehicle of FIG. 1, according to embodiments of the present invention.

FIG. 3 shows a partial view of the communications bus 154 according to some embodiments, in which driver controls 130 and a main autonomy computer 120 are in electronic communication with other entities on the communications bus. In other examples, either driver controls 130 or a main autonomy computer 120 are in electronic communication with other entities on the communications bus. Non-limiting examples of information communicated by driver controls 130 can include steering instructions encoded from a driver-operated steering device such as a steering wheel, braking instructions encoded from a driver-operated braking device such as a brake pedal, and acceleration information encoded from a driver-operated acceleration device such as a gas pedal (accelerator). In various exemplary implementations of the invention, instructions transmitted to VCMs (including VCM-controllers) can be generated by driver controls 130, by an autonomy computer 120, or by both in any combination. A first non-limiting example of a combination includes instructions relating to a first function being propagated by driver controls 130 and instructions relating to a second function being propagated by an autonomy computer 120. A second non-limiting example of a combination includes instructions for given functions being propagated at one time by an autonomy computer 120 during a first mode of operation, e.g., highway driving, and propagated by driver controls 130 at another time during a second mode of operation, e.g., urban driving or emergency-mode driving.

Figure 4:
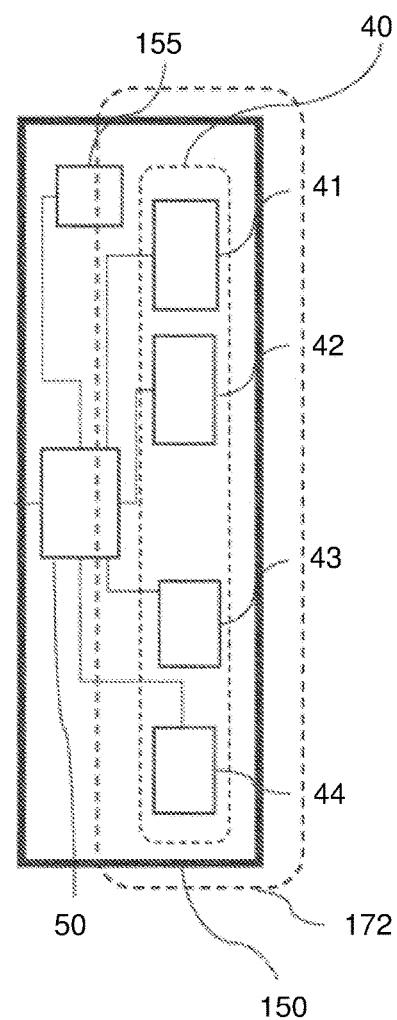
FIG. 4 is a schematic diagram of a VCM-controller comprising functional control modules, according to embodiments of the present invention.

Reference is made to FIG. 4, which shows a schematic diagram of control module architecture according to an embodiment, and not necessarily hardware architecture since control modules can include any combination of hardware, software, and firmware. A VCM 150 includes a group of sub-system control modules 40 which comprises: a suspension control module 41, a braking control module 42, a transmission control module 43, and a steering control module 44. In other embodiments, one or more of control modules 41, 42, 43, 44 may be absent. In still other embodiments, the group The VCM controller 50 is adapted to communicate with all other VCM sub-system control modules 40 and with VCM sensors 155. In addition, The VCM controller 50 may be in active communication with one or more control modules aboard a vehicle platform, e.g., vehicle controller 115 of FIG. 1.

According to some embodiments, one or more of the group of control modules 40 are designed to have merged components and functionality. In some embodiments, merging control modules is by sharing processing algorithms having shared operational parameters (e.g. rotational speed). In some embodiments, merged control units share a power source. In some embodiments, merged control units receive input from a common set of sensors (e.g. sensors included in VCM sensors 155). In some embodiments, merged control units are accommodated within a common mechanical compartment. In some embodiments, merging the control units 40 reduces the size of control units located within VCM 150. In some implementation examples of a VCM-controller 50, one or more of the individual control units 40 comprise separate physical entities. In other implementation examples, one or more of the individual control units 40 comprise different sets of software instructions stored in and executed by a VCM-controller.

Figure 5A:
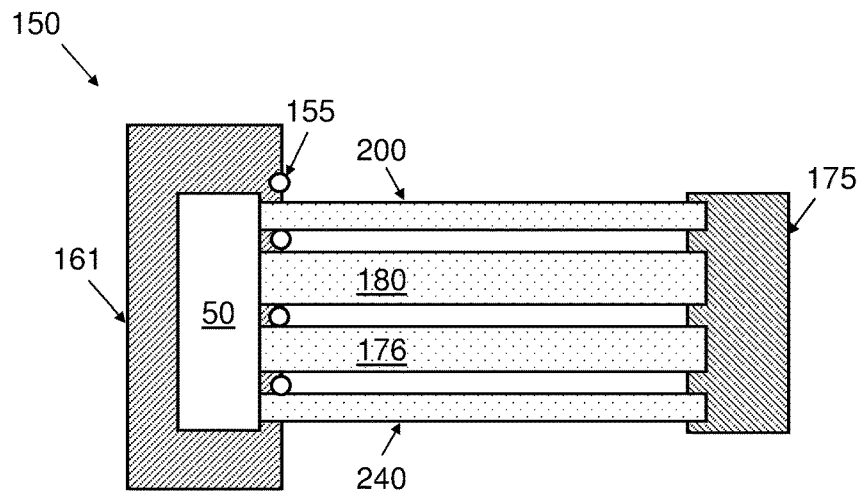
FIGS. 5A, 5B, and 5C are schematic illustrations of a VCM comprising a plurality of sub-systems, according to embodiments of the present invention.

We now refer to FIG. 5A. A VCM 150 according to embodiments includes a plurality of sub-systems each comprising mechanical and/or electrical components and designed to perform a function (or group of related functions). Each of the sub-systems is in contact with, or connected to mechanically and/or electrically, a sub-frame 161 and with a wheel interface 175. Wheel interface 175 is used to mount a wheel assembled to VCM 150. Wheel interface 175 may include, and not exhaustively: a wheel hub, an upright, a knuckle, a spindle, and/or a brake system support. The plurality of sub-systems of each VCM 150 are selected from amongst the following four sub-systems:

a. Steering sub-system 200, which can include any or all of the mechanical and/or electrical components required for steering, i.e., pivoting the wheel of the vehicle around a steering axis, including, and not exhaustively: a steering motor, a steering actuator, steering rods, steering system controller or control unit, steering inverter, and wheel-angle sensor. In embodiments, the VCM-controller 50 of the VCM 150 receives steering instructions as signals from the vehicle, e.g., electronic or optically-transmitted signals from a driver-operated steering mechanism or an autonomous steering unit, and carries out said instructions by causing, responsively to said instructions, the motion of a steering rod, e.g., via a steering actuator, to effect the turning of the wheel, for example, by regulating a current and voltage transmitted to the steering actuator and/or transmitting high-level instructions to a steering-system controller. The steering motor, actuator and/or inverter can receive electrical power from an external power source (external' meaning external to the VCM), such as a battery pack installed in the chassis of the vehicle. A steering system control module 44, where applicable, can receive power either from a power source 59 of the VCM-controller 50 or from the external power source.

b. Drive system 180, which can include any or all of the mechanical and/or electrical components required for actuating a drive shaft to rotate the wheel of the vehicle to drive the vehicle, including, and not exhaustively: an electric drive motor, a driveshaft turned by the motor, and gearing assemblies to transmit the rotation to the wheel including, optionally, a single-hear or multi-gear transmission, as well as sensors such as a wheel speed sensor (in a non-limiting example, a rotary encoder). In some embodiments, the drive motor is included in the VCM, and in some embodiments, the drive motor is on the vehicle, e.g., installed on the chassis. In embodiments, the VCM controller 50 of the VCM 150 is configured to regulate an output of the motor and/or a rotational velocity of the wheel and/or a selection of a transmission gear, in response to instructions received via electrical inputs from the vehicle, e.g., from a driver-operated drive mechanism (e.g. an accelerator pedal) or an autonomous driving unit. In embodiments, the instructions include, for example, a current and a voltage for actuating the electric drive motor. In embodiments, the drive sub-system 180 can be used in a regenerative braking scheme in which the drive motor acts as a generator of electricity when the vehicle slows. Storage of the recuperated electricity can be in a vehicle-onboard energy storage device. In an example, a driver removes a foot from the accelerator pedal (or an autonomous drive system stops powering the drive wheels), and from that point the regenerative braking scheme begins to recuperate electrical energy generated by the slowing of the vehicle, i.e., as the turning of the generator translated via the drivetrain to a mechanical resistance force. In another example, the regenerative braking is boosted by friction braking, i.e., regular operation of the braking system 176, in response to the driver depressing the brake pedal (or receiving a brake-actuation instruction from an autonomous drive computer). In such an example, part of the energy used to brake the vehicle is lost to heat in the 'regular' friction braking arrangement, and at least a part of the energy is recaptured as stored electrical energy. In embodiments, 'cooperation' of the drive system 180 and the braking sub-system 176 in combining regenerative braking with friction braking can be controlled by the VCM-controller 50. In yet another example, in which the VCM-controller is configured (e.g., programmed) to control multiple sub-systems in cooperation with each other, the steering sub-system 200 can be used to assist in braking, i.e., in cooperation with the braking system, for example by turning the wheels so as to increase friction with a roadway, whether by steering symmetrically by having the opposing wheels turn in the same direction in tandem, or asymmetrically where the opposing wheels do not turn in tandem. In a similar example, the VCM-controller controls the steering sub-system 200 in concert with the braking system to mitigate the effect of brake pull caused by steering, a phenomenon also known as 'brake steer' or 'steering drift'. In yet another example, the VCM-controller controls, in concert, the drive system (with respect to regenerative braking), the braking system (with respect to friction braking) and the steering system (with respect to 'braking-by-steering') to achieve a desired braking effect.

c. Braking system 176, which can include any or all of the mechanical and electrical components for actuating a brake assembly (e.g., brake disk, brake caliper, etc.) including, optionally, one or more of a VCM-onboard hydraulic system, a VCM-onboard vacuum-boost system, or a hybrid brake-assist system incorporating a pressurized-gas accumulator and brake actuator. In embodiments, the VCM controller 50 of the VCM 150 is configured to regulate an output of the braking system, e.g., cause a braking action, in response to instructions received via electrical inputs from the vehicle, e.g., from a driver-operated braking mechanism (e.g. a brake pedal) or an autonomous braking unit.

d. Suspension system 240, which can optionally include an active suspension system controllable by the VCM-controller 50 (e.g., via a suspension-system control unit) of the VCM 150. In some exemplary implementations, there is no controllable suspension system installed in the vehicle and only three functional sub-systems are controlled according to the embodiments disclosed herein. In some other exemplary embodiments, control of a controllable suspension system is part of a group of control functions which can include any controllable functions that are not included in control of the drive/transmission system, steering system or braking system.

Figure 5B:
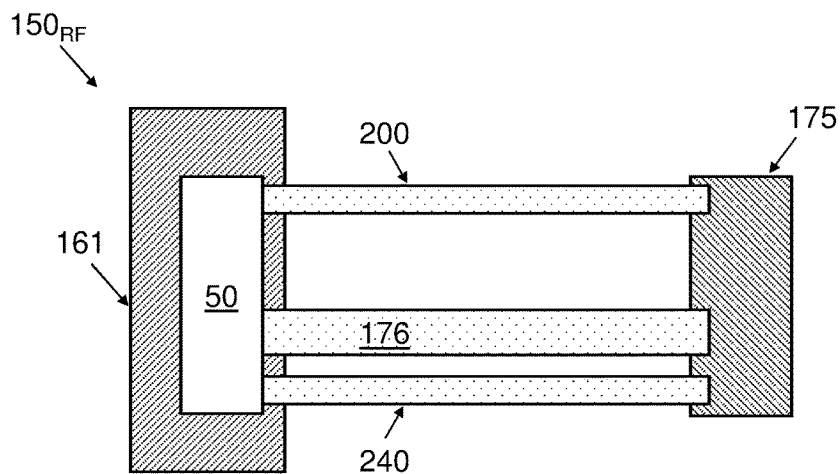
Figure 5C:
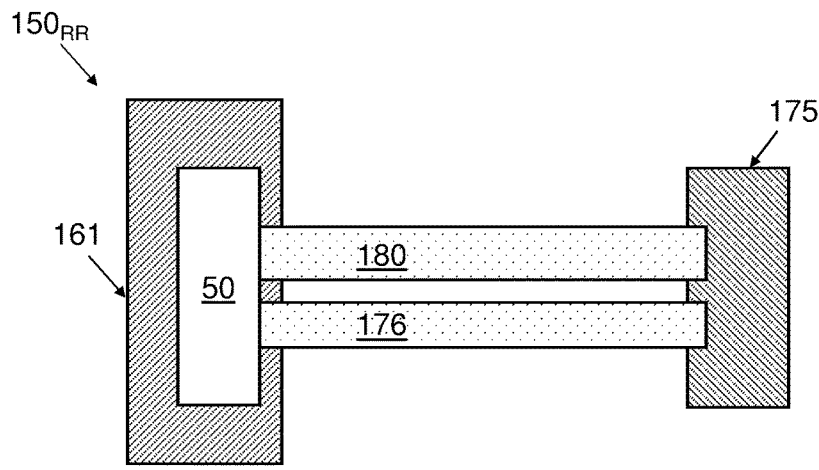

In some embodiments, the plurality of VCM sub-systems in any given VCM 150 includes all of the three or four sub-systems of paragraphs a.-d. In other embodiments, the plurality of VCM sub-systems in a given VCM 150 or in each VCM 150 of a given pair of opposing VCMs 150 can include a selected two sub-systems or a selected three sub-systems. In the non-limiting example of FIG. 5B, an illustrative VCM 150$_{RF}$ for installation as a right-front VCM 150 in a vehicle, includes a steering sub-system 200, a braking sub-system 176, and an active suspension system 240. In the non-limiting example of FIG. 5C, a VCM 150$_{RR}$ for installation as a right-rear VCM 150 in a vehicle, includes a drive sub-system 180 and a braking sub-system 176. In both examples, the included subsystems can be arranged such that they are entirely included in/on the VCM, in that all of the mechanical and electrical components necessary for respective functions can be onboard the VCM 150, with electrical transmission and communications arrangements passing from the vehicle to the VCM-controller and/or to the respective sub-systems (e.g., to their controllers, motors and/or actuators). The passing of electrical transmission and communications arrangements can be via the sub-frame 161 which is mounted to the 'host' vehicle.

Figure 6:
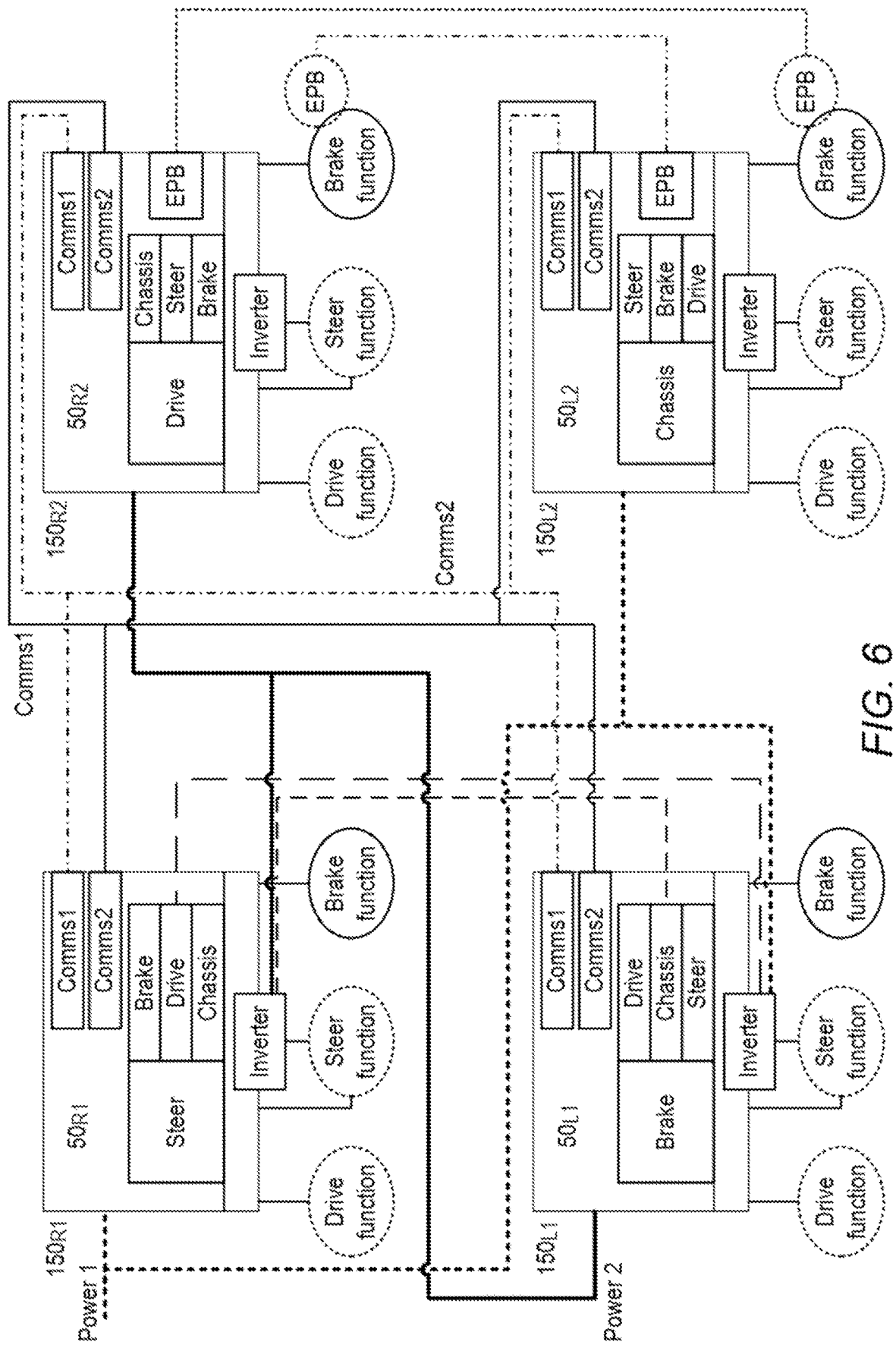
FIG. 6 shows a block diagram of a vehicle comprising four VCMs and four respective VCM-controllers, according to embodiments of the present invention.

Reference is made to FIG. 6, a block diagram of an exemplary implementation of various embodiments of the invention. In the diagram: VCM 150$_{R1}$ represents some components of a front-right VCM 150; VCM 150$_{L1}$ represents some components of a front-left VCM 150; VCM 150$_{R2}$ represents some components of a rear-right VCM 150; and VCM 150$_{L2}$ represents some components of a rear-left VCM 150. At each of the 4 VCMs, a corresponding VCM-controller 50 is shown to include four functional modules: Steer, Brake, Drive, and Chassis, in this case implemented as software modules, i.e., groups of program instructions, within the respective VCM-controllers 50. The 'Chassis' module is reserved for functional control of VCM functions not included in the first three modules. In one example, the Chassis module can include control of controllable suspension systems. While each VCM-controller 50 includes 4 functional modules, one module (the one shown in the largest box in each VCM block in FIG. 6) is given primacy in each VCM-controller. In the non-limiting example of FIG. 6, the Steer module (i.e., a steering control module 44) is shown in the largest box in the VCM box of right-front VCM 150$_{R1}$, indicating that it has been designated to control the steering sub-systems 200 in each one of the VCMs 150 of the vehicle, or, more specifically, in each one of the VCMs 150 of the vehicle that has a steering sub-system 200. Notably, each of the VCM-controllers 50 of the rear VCMs 150$_{R2}$ and 150$_{L2}$ are shown in FIG. 6 to include a steering module. According to embodiments, a functional control module can be included in a VCM-controller 50 of a VCM 150 that doesn't include the corresponding sub-system so as to provide redundancy for controlling the function in case of a control-system fault. Similarly to the Steer module in the VCM-controller of right-front VCM 150$_{R1}$, it can be seen in FIG. 6 that the Brake module (i.e., a braking control module 42) of left-front VCM 150$_{L1}$ is the designated primary controller for the braking function across all VCMs, that the Drive module (i.e., a drive/transmission control module 43) of right-rear VCM 150$_{R2}$ is the designated primary controller for the drive/transmission functions across all VCMs, and that the so-called Chassis module of left-rear VCM 150$_{L2}$ is the designated primary controller for other controllable functions such as, for example, controllable suspension systems. FIG. 6 also illustrates examples of redundant power and communications among the VCMs 150.

It can be understood from the non-limiting example of FIG. 6 that each VCM-controller can control a functional sub-system in its own respective VCM and control the same sub-system in at least one other VCM via the various communications arrangements. The nature of this arrangement means that in any given VCM, there can be a functional sub-system that is being controlled by a VCM-controller of a different VCM. In the example of FIG. 6, the steering system of left-front VCM 150$_{L1}$ is primarily controlled by the VCM-controller 50 of the VCM-controller of the right-front VCM 150$_{R1}$. In other examples, it can be that not all of the VCM-controllers operate in this manner and that only some of the VCM-controllers of a vehicle are designated or configured to control a functional sub-system in another VCM, and/or to have a functional sub-system in its own respective VCM controlled by a different VCM-controller.

The foregoing arrangement can be useful in 'normal', e.g., non-emergency or non-fault conditions, when all of the VCM-controllers and communications arrangement of the vehicle are operating normally. In anticipation of a fault condition in which a VCM-controller is disabled from performing one or more control functions, it can be desirable to design a control system to have built-in redundancy for each of the control functions, using appropriately-configured (e.g., programmed) VCM-controllers to provide redundancy. The term 'disabled' means that a fault in a controller, or (additionally or alternatively) a fault in a communications path, prevents the VCM-controller from performing the function. In some cases, the disabled-ness can be of short duration and recoverable, e.g., by self-diagnosis and/or restarting, and in other cases, the disabled-ness can be long-term and not recoverable without a servicing of the disabled component (e.g., VCM-controller or communications arrangements/bus).

A VCM-controller may identify a control-system fault, or receive an indication of another VCM-controller being 'disabled' from performing one or more control functions, in any one of a number of different ways. In embodiments, the VCM-controller may monitor incoming signals from outside the VCM—from the vehicle, e.g., an autonomy computer, driver controls or a vehicle-controller, and/or from other VCM-controllers in other VCMs—for the absence or presence of a control-system fault. For example, the sudden cessation of a signal from another VCM-controller, e.g., a signal regulating actuation of a functional sub-system, may trigger a response by a VCM-controller to take over the control function for that functional sub-system since it can no longer depend on the other VCM-controller to do the job. Alternatively, the VCM-controller may be configured (e.g., programmed) to allow the other VCM-controller to perform the control function unless actively informed. Additionally or alternatively, the VCM-controller may receive a signal actively indicating existence of a fault condition and that the VCM-controller must take over one or more control functions in its own respective VCM or in another VCM. Conversely, the VCM-controller can relinquish control of a sub-system to another VCM-controller upon receipt of a signal indicating that the other VCM-controller is enabled to perform the control function, where 'enabled means the opposite of 'disabled' as described hereinabove.

The terms 'receiving an indication' and similar terms such as 'receiving a signal indicating', as used herein do not necessarily mean that a signal-based instruction or data transmission is communicated with the specifics of the 'indication'. The term is meant broadly to mean that a controller receives, detects, accesses or computes (e.g., derives) information that was not available before receiving the 'indication'. In various non-limiting examples of 'receiving an indication', a VCM-controller, or any module thereof, may: detect a lack of response in another module or component, or, alternatively, detect a response in another module or component; detect a cessation, establishment/reestablishment or presence of a data stream, e.g., a data stream including control information and/or sensor information; or, via a subcomponent of the VCM-controller such as an instruction-input controller (e.g., an input 'selector') or instruction-output controller (e.g., an output 'stage'), detect or determine the validity or invalidity of a command function from within the VCM-controller or from another VCM-controller.

Figure 7B:
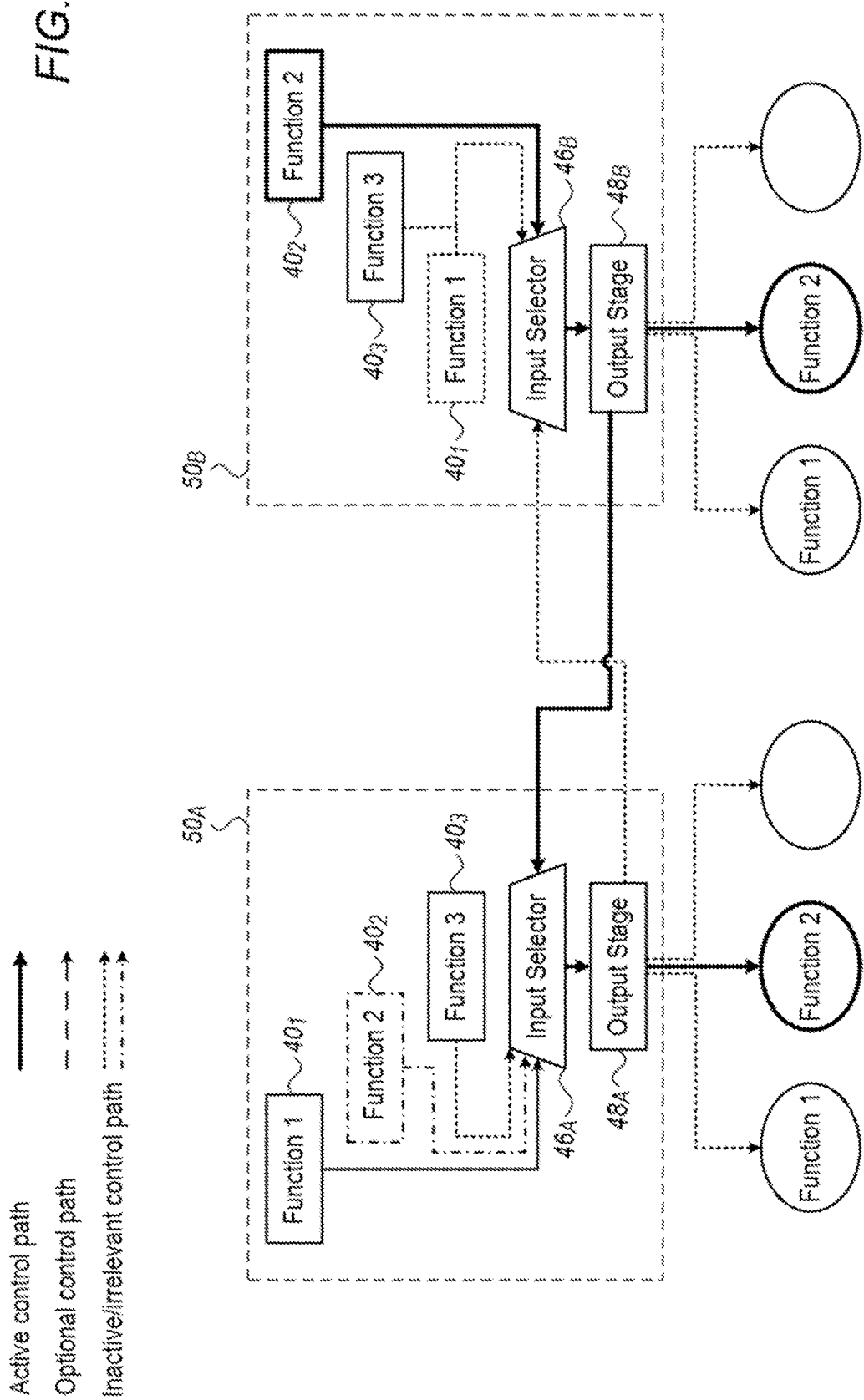

Reference is now made to FIGS. 7A and 7B, which schematically illustrate two VCM-controllers $50_A$, $50_B$, both members of a network of VCM-controllers acting together in a control system, operating in a no-fault condition. Each of the two VCM-controllers includes control modules 401, 402, 403 for controlling respective functions in the VCM (e.g., Function 1, Function 2). The first VCM-controller $50_A$ has Function 1 designated, selected or assigned as its primary function, controlled by control module $40_1$. In parallel, second VCM-controller $50_B$ has Function 2 designated, selected or assigned as its primary function, controlled as indicated by control module $40_2$ being first and largest. A respective input selector module 46 is configured to determine whether an internal command is valid, e.g., to determine whether a given VCM-connector enabled to issue the command to the corresponding functional sub-system. A respective output stage module 48 is effective to receive a valid command passed by the input selector and to route said command to the appropriate functional sub-system(s), i.e., in its own respective VCM and/or in a different VCM that is not the respective VCM.

FIG. 7A illustrates the control/instruction path for controlling Function 1. The first VCM-controller $50A_1$ issues Function 1 instructions, and they are deemed valid by the first input selector module $46_A$ for both VCMs (and possibly of other VCMs which aren't shown in FIGS. 7A-7B). As indicated by the solid line from the Function 1 control module $40_1$, the instructions of the first VCM-controller $50_A$ are forwarded by the first input selector module $46_A$ to (a) the first output stage module $48_A$ for controlling the actuation of the Function 1 sub-system in the first VCM (its own respective VCM), and (b) the second input selector module $46_B$, the latter passing on the validated instructions to the second output stage module $48_B$ for controlling the actuation of the Function 1 sub-system in the second VCM. Notably the Function 1 control module $40_2$ in the second VCM-controller $50_B$ may or may not attempt to issue instructions to the Function 1 sub-system(s), the path shown as a dashed line, but if such instructions are issued, they are not honored by either output stage $48_A$ or $48_B$.

FIG. 7B illustrates the control/instruction path for controlling Function 2. The second VCM-controller $50_B$ issues Function 2 instructions, and they are deemed valid by the second input selector module $46_B$ for both VCMs (and possibly of other VCMs which aren't shown in FIGS. 7A-7B). As indicated by the solid line from the Function 2 control module $40_2$, the instructions of the first VCM-controller $50_B$ are forwarded by the second input selector module $46_B$ to (a) the second output stage module $48_B$ for controlling the actuation of the Function 2 sub-system in the second VCM (its own respective VCM), and (b) the first input selector module $46_A$, the latter passing on the validated instructions to the first output stage module $48_A$ for controlling the actuation of the Function 1 sub-system in the first VCM. Notably the Function 2 control module $40_2$ in the first VCM-controller $50_A$ may or may not attempt to issue instructions to the Function 2 sub-system(s), the path shown as a dashed line, but if such instructions are issued, they are not honored by either output stage $48_B$ or $48_A$.

Control-System Faults

Control-system faults include unexpected situations such as partial and complete failures of controllers, e.g., VCM-controllers, and electronic and physical failures of communications infrastructure. Each of the following four illustrative use-case examples involves a different control-system fault, and includes an exemplary solution according to one or more embodiments of the invention; each exemplary solution illustrates certain aspects of the control systems disclosed herein, as non-limiting examples of applications of the embodiments.

Use case example 1. A first VCM-controller in a first VCM receives an indication of a control-system fault according to which a second VCM-controller, the one that 'normally', i.e., in the absence of a control-system fault, controls a given functional sub-system in the first VCM, suddenly and without warning, is unable to perform, or is disabled from performing, that given control function in the first VCM. The first VCM-controller may or may not be aware of the root cause of the problem, e.g., whether it's a controller failure or a communications failure. The first VCM-controller, which has already been performing the control function for a different functional sub-system in the first VCM, now takes over the control function for the given functional sub-system in the first VCM, which until now had been controlled by the second VCM-controller. Additional actions may be taken by the control system to ensure continued safe operation and/or a safe stop of the vehicle.

Use case example 2. A first VCM-controller receives an indication of a control-system fault according to which a second VCM-controller, suddenly and without warning, is unable to perform, or is disabled from performing, a given control function in the second VCM, i.e., control of a given functional control system which the second VCM-controller was controlling in the second VCM up until the occurrence of the control-system fault. The first VCM-controller, regardless of whether it has until now been performing the given control function in the first VCM or in any other VCM, now takes over the control function for the given functional sub-system in the second VCM from the second VCM-controller which has suddenly been disabled from doing it. Additional actions may be taken by the control system to ensure continued safe operation and/or a safe stop of the vehicle.

Use case example 3. A first VCM-controller receives an indication of a control-system fault according to which a second VCM-controller, suddenly and without warning, is unable to perform, or is disabled from performing, at least one, or perhaps all, of the control functions in the second VCM. The first VCM-controller now takes over the control function for all of the functional sub-systems in the second VCM. Additional actions may be taken by the control system to ensure continued safe operation and/or a safe stop of the vehicle.

Use case example 4. A first VCM-controller receives an indication of a control-system fault according to which every other VCM-controller that had been tasked with controlling a functional-sub-system in the first VCM is unable to perform, or is disabled from performing, such control functions in the first VCM. The first VCM-controller may or may not be aware of the root cause of the problem, e.g., whether it's a controller failure, a communications failure, or a combination of both. The first VCM-controller now takes over the control function for all of the functional sub-systems in the first VCM, i.e., it's own respective VCM. Additional actions may be taken by the control system to ensure continued safe operation and/or a safe stop of the vehicle.

Figure 8B:
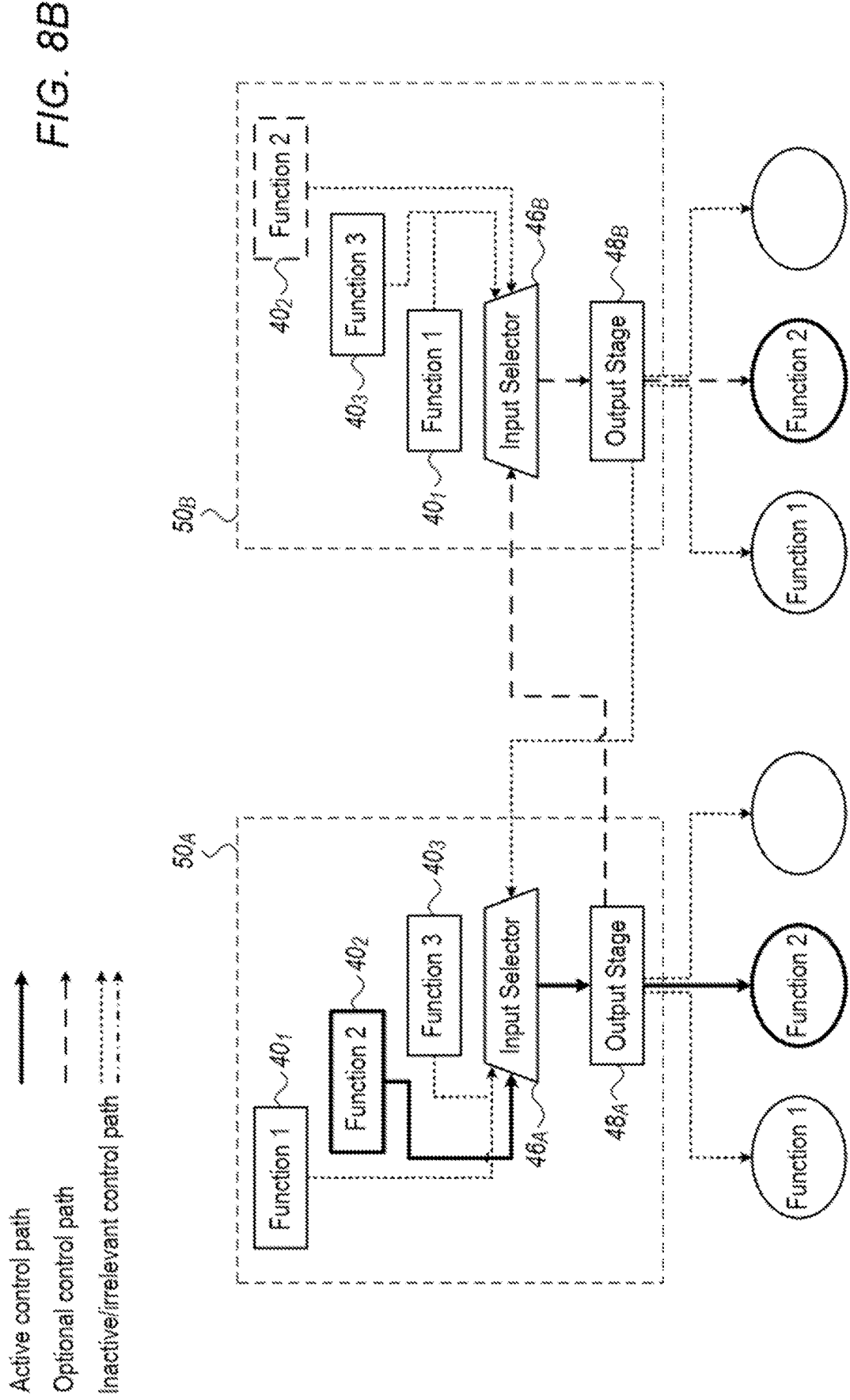
Figure 8C:
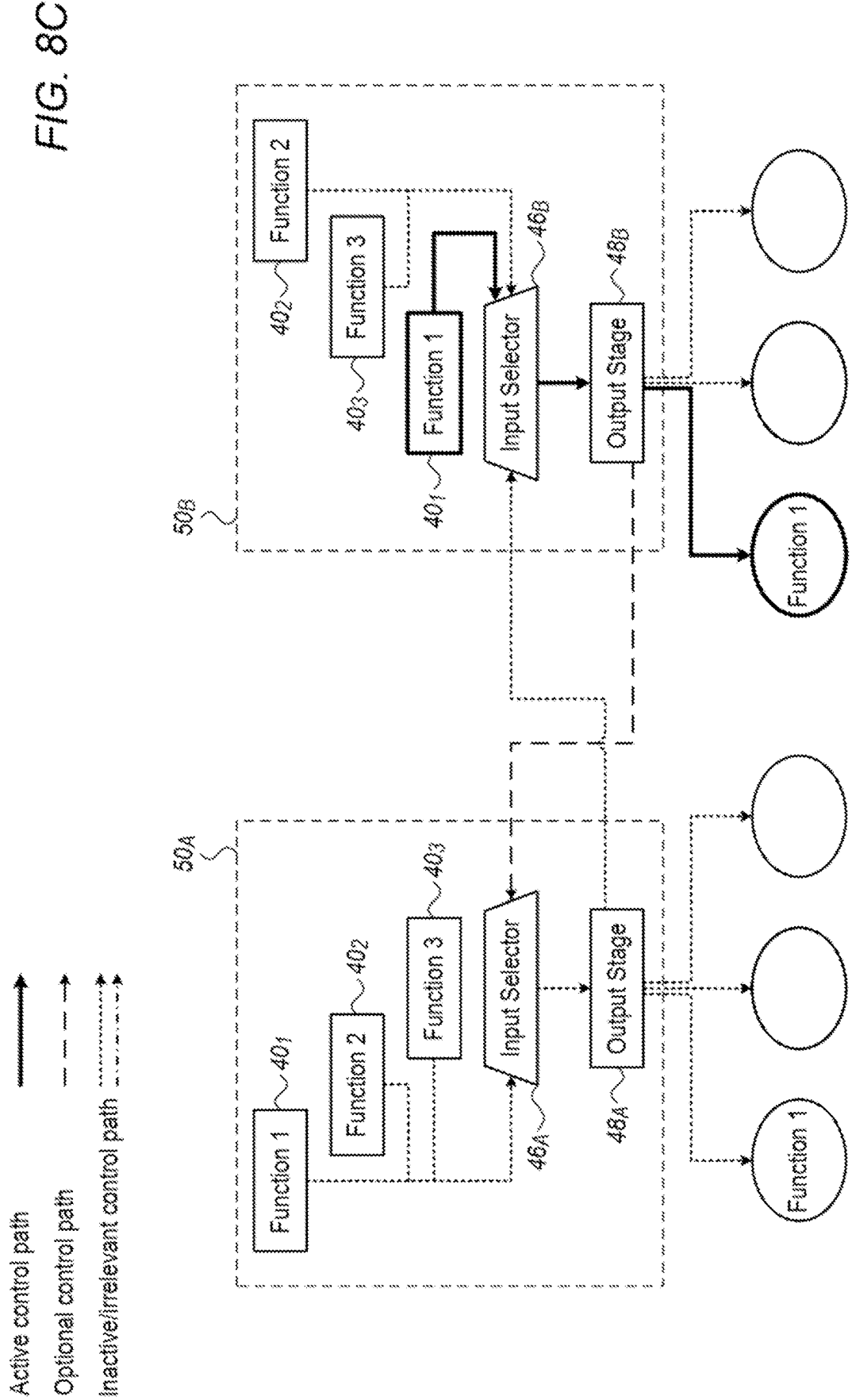

Reference is now made to FIGS. 8A-C.

FIG. 8A illustrates a first non-limiting example of a response, by the VCM-controllers $50_A$ and $50_B$ of FIGS. 7A-7B, to a control-system fault in a scenario similar to use-case example 1 described above. According to the exemplary control-system fault, the first VCM-controller $50_A$ has experienced a controller-level software fault, and the Function 1 instructions issued by first VCM-controller $50_A$ are invalid. This invalidity can be established by one or both of the input selectors $46_A$, $46_B$. The response, e.g., a pre-programmed response or a response arrived at by applying programmed machine learning techniques to historical events and/or third-party events to derive an appropriate response, is that the second VCM-controller $50_B$ must take over control of Function 1 in both VCMs. Thus, the second VCM-controller $50_B$ issues Function 1 control instructions which are now the (solid-line) active control path, (a) recognized by the second input selector module $46_B$ as valid and passed on to the output stage module $46_B$ for execution in the second VCM, and (b) propagated to the input selector $46_A$ of the first (and software-failed) VCM-controller $50_A$ and thence to the corresponding output stage $46_B$ for execution in the VCM.

FIG. 8B illustrates a similar example of a response, by the VCM-controllers $50_A$ and $50_B$ of FIGS. 7A-7B, to a control-system fault in a second scenario similar to use-case example 1 described above. According to the exemplary control-system fault, the second VCM-controller $50_B$ has experienced a fault with respect to the Function 2 control module $40_2$. The response, e.g., a pre-programmed response or a response arrived at by applying programmed machine learning techniques to historical events and/or third-party events to derive an appropriate response, is that the first VCM-controller $50_A$ must take over control of Function 2 in both VCMs. Thus, the first VCM-controller $50_A$ issues Function 2 control instructions which are now the (solid-line) active control path, (a) recognized by the second input selector module $46_A$ as valid and passed on to the output stage module $46_A$ for execution in the first VCM, and (b) propagated to the input selector $46_B$ of the second (and failed) VCM-controller $50_B$ and thence to the corresponding output stage $46_B$ for execution in the VCM.

FIG. 8C illustrates an alternate scenario to that of in which VCM-controller $50_A$ undergoes a complete hardware failure, including its Function 1 controller $40_1$, along with input selector $46_A$ and output stage $46_B$. The response, e.g., a pre-programmed response or a response arrived at by applying programmed machine learning techniques to historical events and/or third-party events to derive an appropriate response, is that the second VCM-controller $50_B$ must take over control of Function 1 in its own VCM. VCM-controller $50_B$ attempts to take over control of Function 1 in the other VCM (of VCM-controller $50_A$) but is unable to do so. In the absence of 'assistance' from other controllers, VCM-controller $50_B$ will undertake other countermeasures; in an example, Function 1 is the braking function, and VCM-controller $50_B$ can contribute to a safe braking of the vehicle by using the electric drive motor for slowing, and a sharp turning of the wheel to effect the stopping. In another example (not shown), a redundant actuator and/or communication path to an actuator can be provided.

Discussion of VCM-Controllers

In embodiments, each VCM of a vehicle includes a VCM-controller configured to perform control functions with respect to functional sub-systems within the VCM and/or in other VCMs, where 'configured' means that controller includes hardware, software and/or firmware components for performing the control functions. The VCM-controller can include program instructions, e.g., stored on the controller or accessible therefrom, for performing the control functions, or can be programmed to apply machine learning techniques to sensor data, historical events and/or third-party events to derive an appropriate set of control-function instructions. The VCM-controller can be a member of a network of VCM-controllers and can be programmed for acting as part of a control system as described hereinabove, and the program instructions executable by processors of the VCM-controller can be directed to perform control functions in accordance with the various embodiments of control systems disclosed herein. When a VCM-controller is replaced, e.g., for maintenance or upgrade, the replacement VCM-controller can replace the replaced VCM-controller as a member of the network of VCM-controllers in performing the control functions of the vehicle's control system.

Figure 9A:
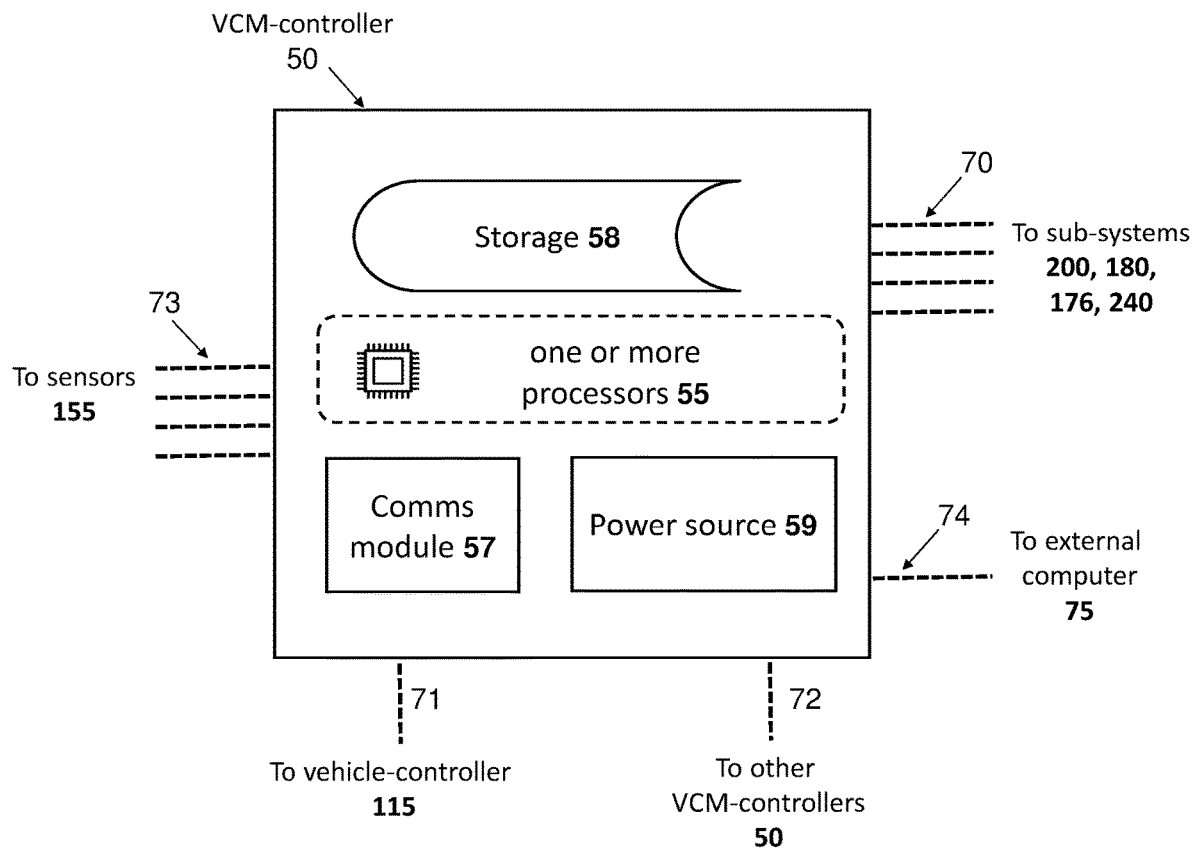
FIGS. 9A, 9B, 10A, 10B, 10C, and 10D are schematic diagrams of a VCM-controller, according to embodiments of the present invention.

Referring now to FIG. 9A, a VCM-controller 50 according to embodiments is illustrated schematically to show selected hardware components. The exemplary VCM-controller 50 of FIG. 9A includes one or more computer processors 55, a computer-readable storage medium 58, a communications module 57, and a power source 59. The computer-readable storage medium 58 can include transient and/or transient storage, and can include one or more storage units, all in accordance with desired functionality and design choices. In embodiments, the storage 58 can be used for any one or more of: storing program instructions, in firmware and/or software, for execution by the one or more processors 55 of the VCM-controller 50; and historical operating data and/or maintenance data and/or ownership data relating to the VCM and/or any one or more of its sub-systems and their components. The communications module 59 is configured to establish communications links with a vehicle-onboard vehicle controller 115 via communications arrangements 71, to other VCM controllers 50 e.g., VCM controllers 50 of VCMs 150 of the same vehicle 100, via communications arrangements 72, to an external computer 75 via communications arrangements 74 to VCM subsystems 200, 180, 176, (and optionally 240), including to respective sub-system control units via communications arrangements 70, and to sensors 155 e.g., sensors 155 located in/on the VCM 150, via communications arrangements 73. In embodiments, not every VCM-controller 50 includes all of the components shown in FIG. 9A.

Figure 9B:
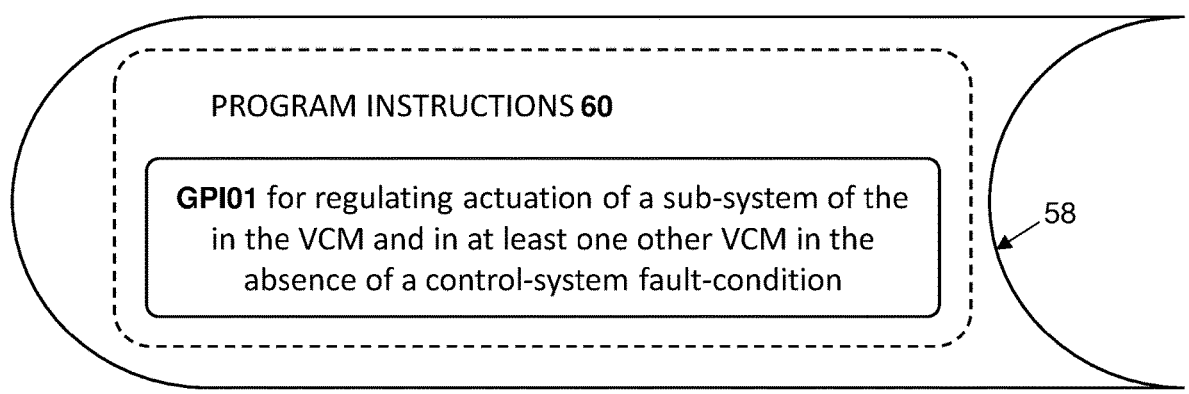

The storage medium 58 of the exemplary VCM controller 50 is shown in FIG. 9B to include program instructions 60 related to operation of a VCM 150 on a vehicle 100. In the example illustrated in FIG. 9B, the program instructions 60 includes a single group of program instructions GPI01 for execution by the one or more processors 55 of the VCM-controller 50:

Program Instructions GPI01 for regulating actuation of a sub-system of the in the VCM and in at least one other VCM in the absence of a control-system fault-condition. The control function (regulating the actuation of the sub-system) is carried out in response to signals received from outside the VCM. In embodiments, the instructions of GPI01 can include regulating the actuation of a first sub-system of the VCM, and exclude regulating the actuation of a second sub-system of the VCM—because under 'normal' conditions, the second sub-system is controller in the VCM by a different VCM-controller. In some embodiments, the instructions of GPI01 can include instructions for regulating the actuation of second first sub-system, but such instructions are not executed in the absence of a control-system fault indicating that a different networked VCM-controller is disabled from regulating actuation of said second sub-system in the VCM. In some embodiments, the instructions of GPI01 can include instructions for regulating the actuation of second first sub-system, but such instructions are not executed if the controller has received a control-system indication that a different networked VCM-controller is enabled to regulate actuation of said second sub-system in the VCM.

Figure 10A:
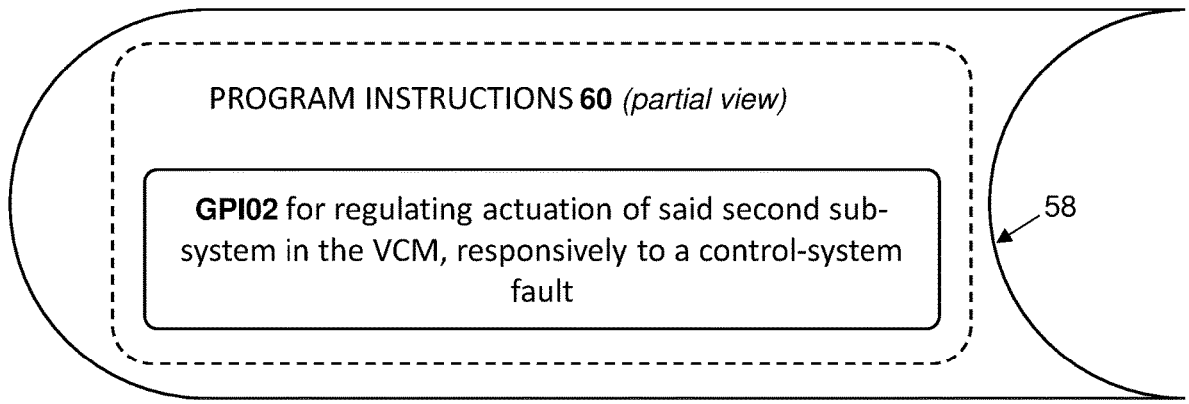

In various embodiments, as illustrated in FIG. 10A, the program instructions 60 stored in storage medium 58 of the exemplary VCM controller 50 can additionally include an additional groups of program instructions GPI102, for execution by the one or more processors 55 of the VCM-controller 50:

Program Instructions GPI02 for regulating actuation of the second sub-system in the VCM. In embodiments, the program instructions of GPI02 are executed in response to an indication of a control-system fault according to which the different VCM-controller (that had been controlling the second sub-system in the VCM before the control-system fault) is now disabled from performing that function. The program instructions GPI02 correspond to control-system fault use-case example 1, discussed hereinabove.

Figure 10B:
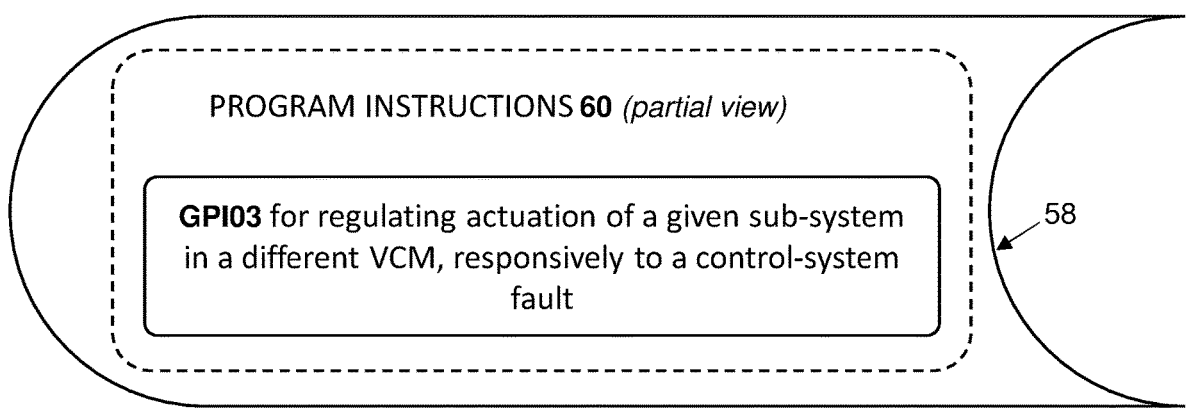

In various embodiments, as illustrated in FIG. 10B, the program instructions 60 stored in storage medium 58 of the exemplary VCM controller 50 can additionally include an additional groups of program instructions GPI103, for execution by the one or more processors 55 of the VCM-controller 50:

Program Instructions GPI03 for regulating actuation of a given functional sub-system in a different VCM. In embodiments, the program instructions of GPI03 are executed in response to an indication of a control-system fault according to which the respective VCM-controller of the different VCM, which had been controlling the given functional sub-system in the different VCM before the control-system fault, is now disabled from performing that function. The program instructions GPI03 correspond to control-system fault use-case example 2, discussed hereinabove.

Figure 10C:
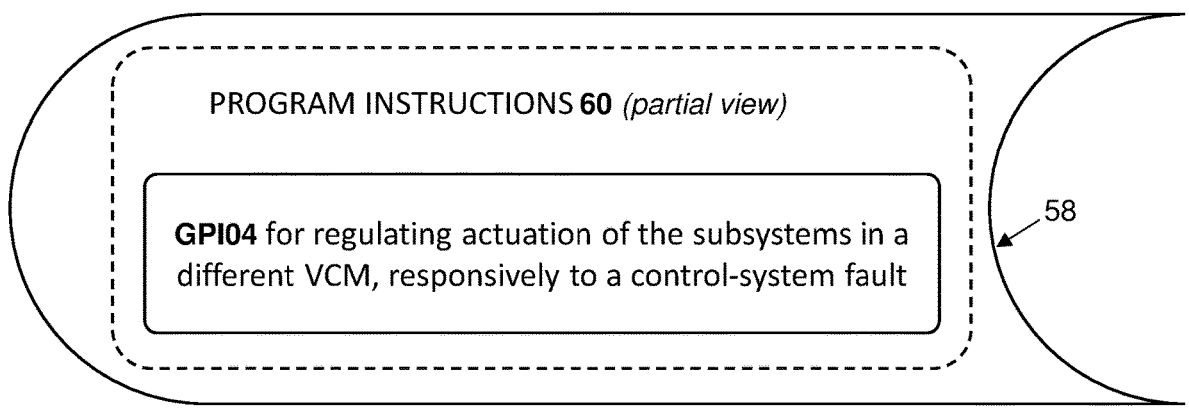

In various embodiments, as illustrated in FIG. 10C, the program instructions 60 stored in storage medium 58 of the exemplary VCM controller 50 can additionally include an additional groups of program instructions GPI104, for execution by the one or more processors 55 of the VCM-controller 50:

Program Instructions GPI04 for regulating actuation of the respective subsystems in a different VCM. In embodiments, the program instructions of GPI04 are executed in response to an indication of a control-system fault indicating that the respective VCM controller of the different VCM is disabled from regulating actuation of at least one of the sub-systems in the different VCM. In some embodiments, the respective VCM-controller of the different VCM is disabled from regulating actuation of all of the sub-systems in the different VCM before the control-system fault. In some embodiments, a respective VCM-controller of a second different VCM had been controlling at least one of the sub-systems in the different VCM before the control-system fault. In some such embodiments, the program instructions of GPI04 can be executed in response to an indication of a control-system fault indicating that the VCM-controller of the second different VCM is now disabled from perform that at least one control function. The program instructions GPI04 correspond to control-system fault use-case example 3, discussed hereinabove.

Figure 10D:
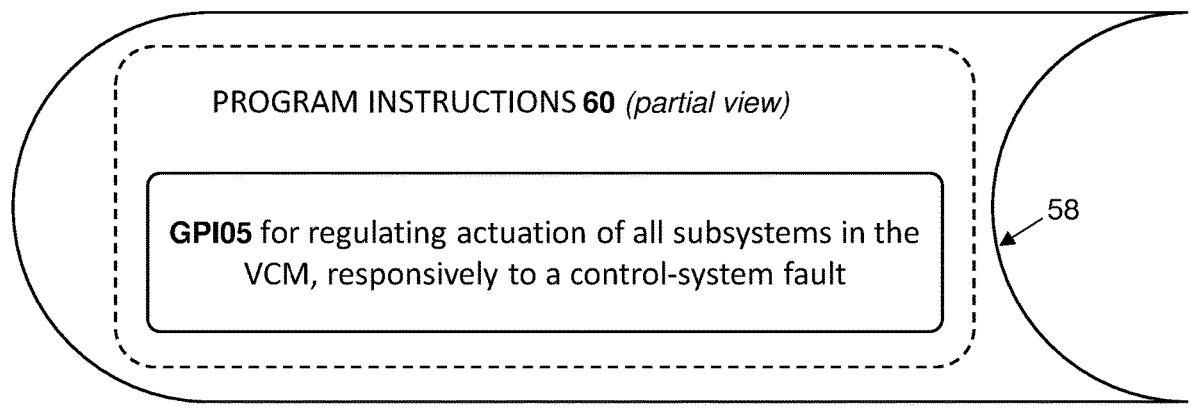

In various embodiments, as illustrated in FIG. 10D, the program instructions 60 stored in storage medium 58 of the exemplary VCM controller 50 can additionally include additional groups of program instructions GPI105, for execution by the one or more processors 55 of the VCM-controller 50:

Program Instructions GPI05 for regulating actuation of all subsystems in the VCM. In embodiments, the program instructions of GPI05 are executed in response to an indication of a control-system fault indicating that no other VCM-controllers are enabled to regulate actuation of any sub-systems in the VCM. In some embodiments, one or more of the other VCM-controllers (all of which are members of the network of VCM-controllers) been controlling at least one of the sub-systems in the VCM before the control-system fault. The program instructions GPI03 correspond to control-system fault use-case example 4, discussed hereinabove.

According to embodiments, the program instructions 60 stored in storage medium 58 can include the program instructions of GPI01, in addition to any one or more of the groups of program instructions GPI02, GPI03, GPI04 or GPI05, in any combination.

Discussion of Methods

Figure 11A:
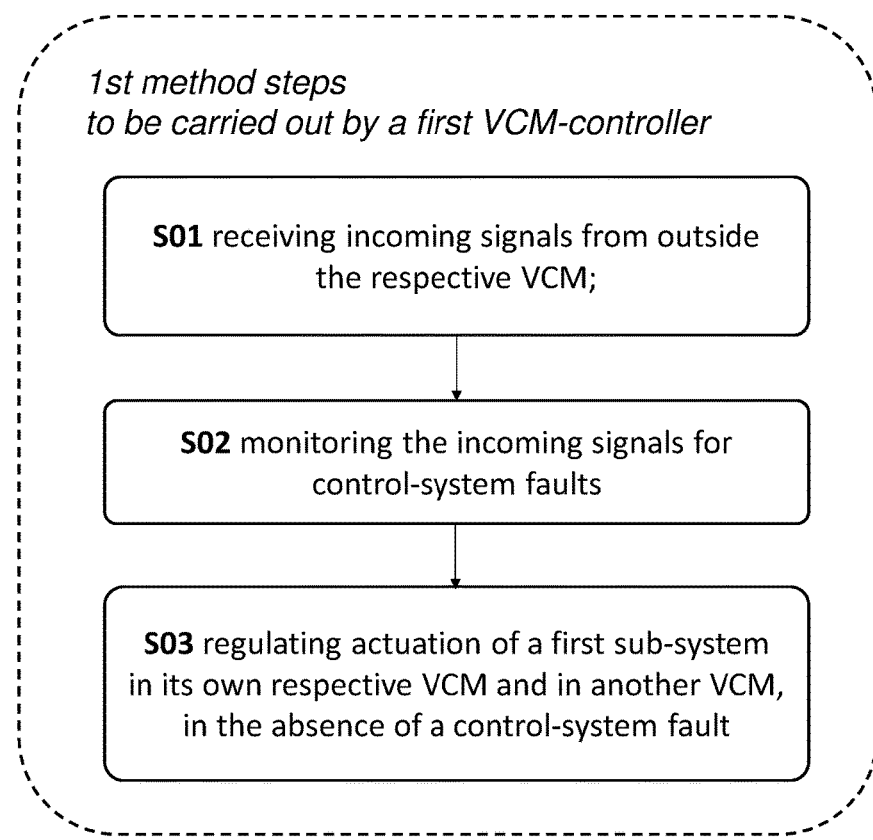
FIGS. 11A and 11B show flowcharts of steps of a method for operating a vehicle in the absence of a control-system fault, according to embodiments of the present invention.

Referring now to FIG. 11A, a method is disclosed for operating a vehicle 100, e.g., the vehicle 100 of FIG. 1 comprising a plurality of VCMs 150 wherein each comprises at least two functional subsystems as disclosed hereinabove. According to the method, the vehicle 100 comprises a network 30 of VCM-controllers 50. As illustrated by the flow chart in FIG. 11A, the method comprises 1st method steps S01, S02, and S03 to be carried out by a first VCM-controller 50:

Step S01 receiving incoming signals from outside its respective VCM;

Step S02 monitoring the incoming signals for control-system faults; and

Step S03 regulating actuation of a first sub-system in its own respective VCM and in at least one other VCM, in response to the incoming signals and in the absence of a control-system fault.

Figure 11B:
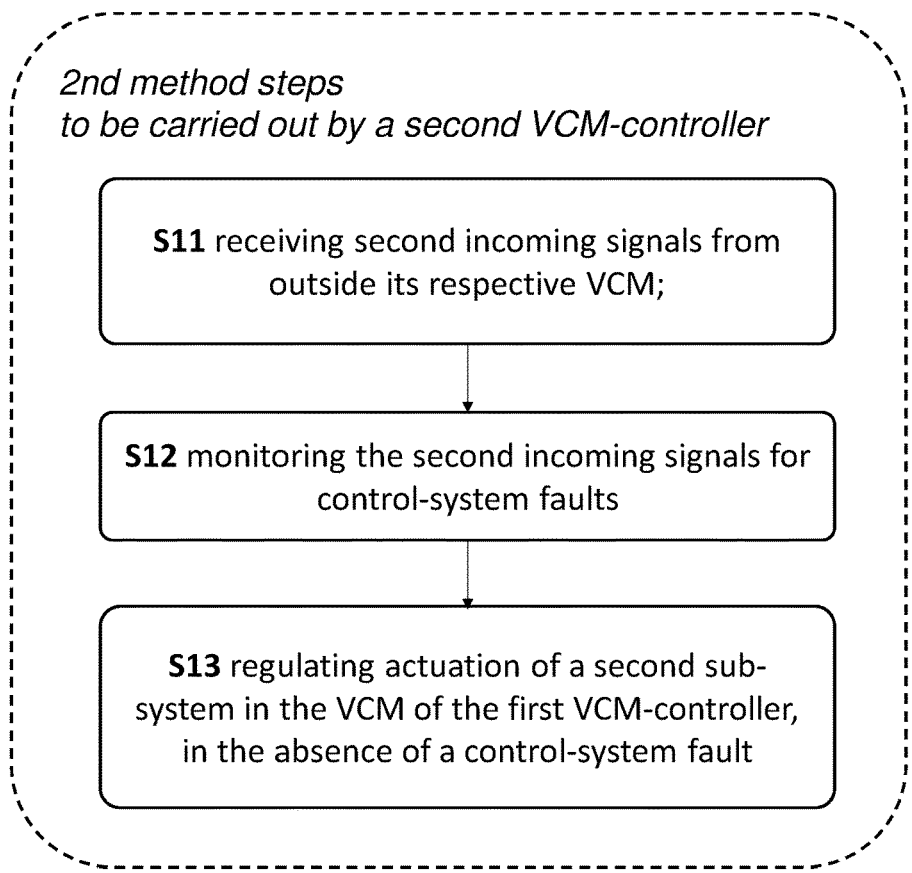

In some embodiments, the method additionally includes 2nd method steps S11, S12 and S13 to be carried out by a second VCM-controller 50, as illustrated in FIG. 11B:

Step S11 receiving second incoming signals from outside its respective VCM;

Step S12 monitoring the second incoming signals for control-system faults; and

Step S13 regulating actuation of a second sub-system in the respective VCM of the first VCM-controller, in response to the incoming signals and in the absence of a control-system fault.

Figure 12A:
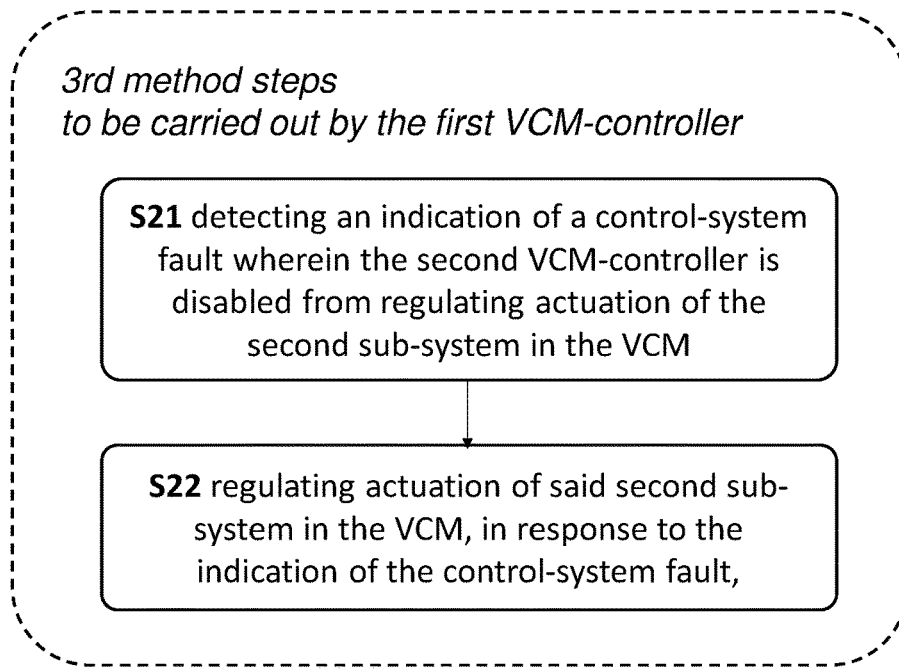
FIGS. 12A, 12B, 12C, and 12D show flowcharts of steps of a method for operating a vehicle in the presence of a control-system fault, according to embodiments of the present invention.

In some embodiments, the method additionally includes 3rd method steps S21 and S22 to be carried out by the first VCM-controller 50, as illustrated in FIG. 12A:

Step S21 detecting, in the incoming signals, an indication of a control-system fault according to which the second VCM-controller is disabled from regulating actuation of said second sub-system in the VCM (of the first VCM-controller); and Step S22 in response to the indication of the control-system fault, regulating actuation of said second sub-system in the VCM.

The 3rd method steps S21 and S22 correspond to control-system fault use-case example 1, discussed hereinabove.

Figure 12B:
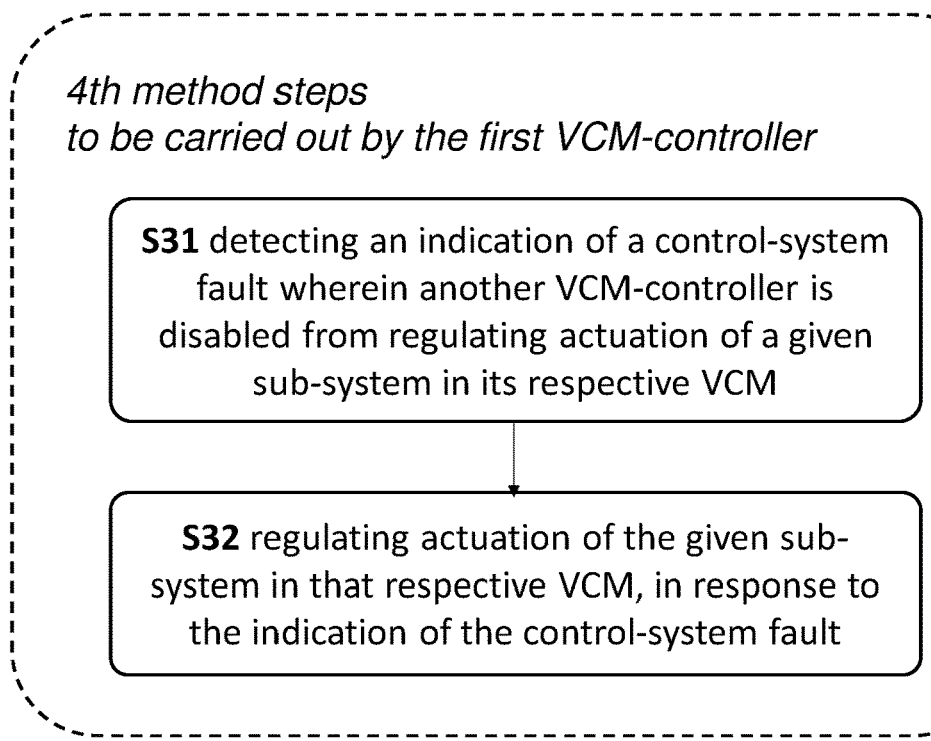

In some embodiments, the method additionally includes 4th method steps S31 and S32 to be carried out by the first VCM-controller 50, as illustrated in FIG. 12B:

Step S31 detecting, in the incoming signals, an indication of a control-system fault according to which a different networked VCM-controller is disabled from regulating actuation of a given sub-system in its respective VCM; and Step S32 in response to the indication of the control-system fault, regulating actuation of said given sub-system in the respective VCM (of the different networked VCM-controller).

The 4th method steps S31 and S32 correspond to control-system fault use-case example 2, discussed hereinabove.

Figure 12C:
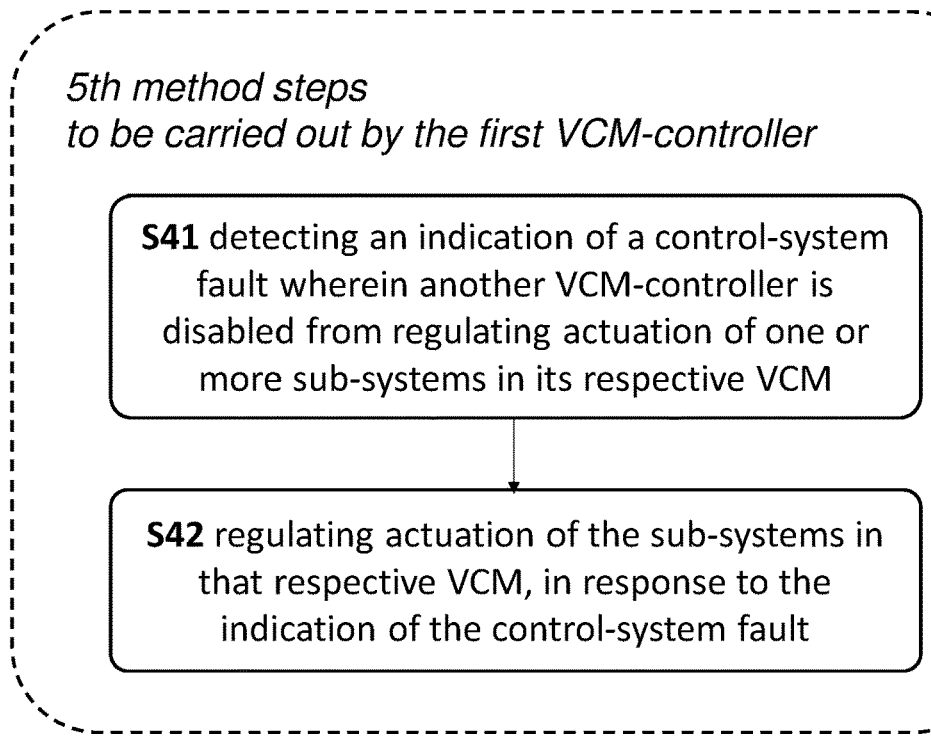

In some embodiments, the method additionally includes 5th method steps S41 and S42 to be carried out by the first VCM-controller 50, as illustrated in FIG. 12C:

Step S41 detecting, in the incoming signals, an indication of a control-system fault according to which a different networked VCM-controller is disabled from regulating actuation of one or more sub-systems in its respective VCM; and Step S42 in response to the indication of the control-system fault, regulating actuation of the at least two sub-subsystems in the respective VCM (of the different networked VCM-controller).

The 5th method steps S41 and S42 correspond to control-system fault use-case example 3, discussed hereinabove.

Figure 12D:
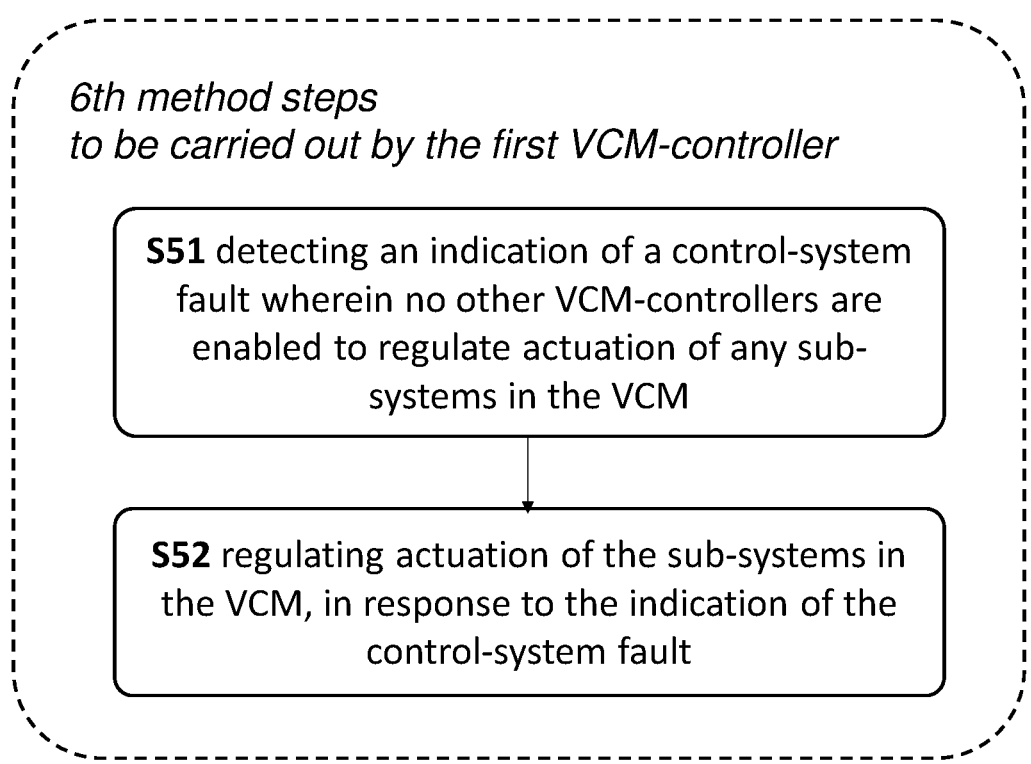

In some embodiments, the method additionally includes 6th method steps S51 and S52 to be carried out by the first VCM-controller 50, as illustrated in FIG. 12D:

Step S51 detecting, in the incoming signals, an indication of a control-system fault according to which no other VCM-controllers are enabled to regulate actuation of any sub-systems in the VCM; and Step S52 in response to the indication of the control-system fault, regulating actuation of the at least two subsystems in the VCM.

The 6th method steps S51 and S52 correspond to control-system fault use-case example 4, discussed hereinabove.

According to embodiments, the method can include the 1st method steps, in addition to any one or more of the 2nd, 3rd, 4th, 5th, and 6th method steps, in any combination.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a marking" or "at least one marking" may include a plurality of markings.

The invention claimed is:

1. A control system for an electrically-powered vehicle, the vehicle comprising a plurality of electrically-powered vehicle corner modules (VCMs), each VCM comprising at least two subsystems selected from the group of subsystems consisting of a drive subsystem, a steering subsystem and a braking subsystem, the control system comprising:

a network of VCM-controllers, each VCM-controller being (i) onboard and installed within a different respective VCM of the plurality of VCMs, and (ii) operatively linked to each one of the at least two subsystems of the respective VCM in which the VCM-controller is installed to receive therefrom sensor data and to regulate operation thereof in response to the respectively received incoming signals, received from outside the respective VCM in which the VCM-controller is installed, wherein in a no-fault operating mode defined by the absence of a control-system fault, each VCM controller regulates, concurrently with the other VCM-controllers of the network of VCM-controllers and in response to the respectively received incoming signals, actuation of a first sub-system of the at least two sub-systems in the respective VCM in which the VCM-controller is installed and in at least one other VCM.

2. The control system of claim 1, wherein the no-fault operating mode is characterized in that actuation in the respective VCM in which the VCM-controller is installed of a second sub-system of the at least two sub-systems is regulated by a VCM-controller of a different VCM that is not the respective VCM in which the VCM-controller is installed.

3. An electrically-powered vehicle comprising the control system of claim 1.

4. The control system of claim 1, wherein the at least one other VCM includes a second VCM of an opposing pair of VCMs, the opposing pair additionally comprising the respective VCM in which the VCM-controller is installed.

5. The control system of claim 4, wherein the first sub-system of the at least two sub-systems in the respective VCM in which the VCM-controller is installed, and the sub-system in the at least one other VCM, are not the same sub-system selected from the group of subsystems consisting of a drive subsystem, a steering subsystem and a braking subsystem.

6. The control system of claim 4, wherein the first sub-system of the at least two sub-systems in the respective VCM in which the VCM-controller is installed, and the sub-system in the at least one other VCM, are different sub-systems selected from the group of subsystems consisting of a drive subsystem, a steering subsystem and a braking subsystem.

7. A control system for an electrically-powered vehicle, the electrically-powered vehicle comprising a plurality of vehicle corner modules (VCMs), each VCM comprising at least two subsystems selected from the group of subsystems consisting of a drive subsystem, a steering subsystem and a braking subsystem, the control system comprising:
- a network of VCM-controllers, each VCM-controller being (i) onboard and installed within a different respective VCM of the plurality of VCMs, and (ii) operatively linked to each one of the at least two subsystems of its respective VCM to receive therefrom sensor data and to regulate operation thereof in response to incoming signals received from outside the respective VCM in which the VCM-controller is installed,
- wherein in a no-fault operating mode defined by the absence of a control-system fault, each VCM controller regulates, concurrently with the other VCM-controllers of the network of VCM-controllers and in response to the respectively received incoming signals, actuation of a first sub-system of the at least two sub-systems in the respective VCM in which the VCM-controller is installed and in at least one other VCM, the no-fault operating mode being characterized in that actuation in the respective VCM in which the VCM-controller is installed of a second sub-system of the at least two sub-systems is concurrently regulated by a VCM-controller of a different VCM that is not the respective VCM in which the VCM-controller is installed.

8. The control system of claim 7, wherein in a first fault-responsive operating mode, each VCM-controller installed in a VCM comprising said second sub-system regulates actuation of said second sub-system in the respective VCM in which the VCM-controller is installed, the first fault-responsive operating mode being characterized by the VCM-controller of the different VCM that is not the respective VCM in which the VCM-controller is installed being disabled from regulating actuation of said second sub-system in the respective VCM in which the VCM-controller is installed.

9. The control system of claim 7, wherein in a second fault-responsive operating mode, a VCM-controller of a given VCM regulates actuation of a given sub-system of the at least two sub-subsystems in a different VCM that is not the given VCM, the second fault-responsive operating mode being characterized by the VCM controller of the different VCM being disabled from regulating actuation, in the different VCM, of said given sub-system.

10. The control system of claim 7, wherein in a third fault-responsive operating mode, a VCM controller of a given VCM regulates actuation of the respective at least two subsystems in a different VCM that is not the given VCM, the third fault-responsive operating mode being characterized by the VCM controller of the different VCM being disabled from regulating actuation of one or more of the at least two sub-systems in the different VCM.

11. The control system of claim 7, wherein in a fourth fault-responsive operating mode, a VCM controller of a given VCM regulates actuation of the at least two subsystems in the given VCM, the fourth fault-responsive mode being characterized by a plurality of VCM-controllers of different respective VCMs, none of which are the given VCM, being disabled from regulating actuation of respective sub-systems of the at least two sub-systems in the respective VCM.

12. The control system of claim 7, wherein said first sub-system is selected in accordance with an operating profile assigned to the respective VCM.

13. An electrically-powered vehicle comprising the control system of claim 7.

14. The control system of claim 7, wherein the at least one other VCM includes a second VCM of an opposing pair of VCMs, the opposing pair additionally comprising the respective VCM in which the VCM-controller is installed.

15. The control system of claim 14, wherein the first sub-system of the at least two sub-systems in the respective VCM in which the VCM-controller is installed, and the sub-system in the at least one other VCM, are the same sub-system selected from the group of subsystems consisting of a drive subsystem, a steering subsystem and a braking subsystem.

16. The control system of claim 14, wherein the first sub-system of the at least two sub-systems in the respective VCM in which the VCM-controller is installed, and the sub-system in the at least one other VCM, are different sub-systems selected from the group of subsystems consisting of a drive subsystem, a steering subsystem and a braking subsystem.

17. The control system of claim 7, wherein the at least one other VCM includes the different VCM that is not the respective VCM in which the VCM-controller is installed.

18. The control system of claim 7, wherein the different VCM that is not the respective VCM in which the VCM-controller is installed includes a second VCM of an opposing pair of VCMs, the opposing pair additionally comprising the respective VCM in which the VCM-controller is installed.

19. The control system of claim 7, wherein the different VCM that is not the respective VCM additionally regulates actuation of a sub-system of the at least two sub-systems in said different VCM, wherein said sub-system in said different VCM and the second sub-system in the respective VCM are the same sub-system selected from the group of subsystems consisting of a drive subsystem, a steering subsystem and a braking subsystem.

* * * * *